US012609228B2

(12) United States Patent
Sato et al.

(10) Patent No.: US 12,609,228 B2
(45) Date of Patent: Apr. 21, 2026

(54) ELECTROMAGNETIC DEVICE, ALIGNMENT APPARATUS, AND ARTICLE MANUFACTURING METHOD

(71) Applicant: CANON KABUSHIKI KAISHA, Tokyo (JP)

(72) Inventors: Takeshi Sato, Tochigi (JP); Shigeo Koya, Tochigi (JP); Nobushige Korenaga, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 18/300,792

(22) Filed: Apr. 14, 2023

(65) Prior Publication Data

US 2023/0352225 A1 Nov. 2, 2023

(30) Foreign Application Priority Data

Apr. 28, 2022 (JP) ................................ 2022-075367

(51) Int. Cl.
*H01F 7/08* (2006.01)
*H01F 27/24* (2006.01)
*H01F 27/28* (2006.01)

(52) U.S. Cl.
CPC ............ *H01F 7/081* (2013.01); *H01F 27/24* (2013.01); *H01F 27/28* (2013.01)

(58) Field of Classification Search
None
See application file for complete search history.

(56) References Cited

U.S. PATENT DOCUMENTS

| | | | | |
|---|---|---|---|---|
| 5,311,028 | A | 5/1994 | Glavish | |
| 2001/0030307 | A1 | 10/2001 | Bergstrom et al. | |
| 2003/0173833 | A1 * | 9/2003 | Hazelton ........... | H02K 41/0356 310/90.5 |
| 2004/0061396 | A1 | 4/2004 | Narita et al. | |
| 2005/0211920 | A1 * | 9/2005 | Shibata .............. | G03F 7/70716 355/72 |

(Continued)

FOREIGN PATENT DOCUMENTS

| | | | |
|---|---|---|---|
| CN | 107044484 | A | 8/2017 |
| CN | 113867102 | A | 12/2021 |

(Continued)

OTHER PUBLICATIONS

Extended European search report issued in European Appln. No. 23168207.1, mailed on Sep. 11, 2023.

(Continued)

*Primary Examiner* — Bernard Rojas
(74) *Attorney, Agent, or Firm* — ROSSI, KIMMS & McDOWELL LLP

(57) ABSTRACT

An electromagnetic device includes a first member having a first end face, a second member having a second end face facing the first end face through an air gap, and a coil wound around one of the first member and the second member. Each of the first member and the second member is formed from a laminated body of a plurality of steel plates, and a magnetic circuit formed from the first member and the second member includes a changing part at which a lamination direction of the laminated body changes at a right angle to generate a magnetic flux along a plane direction of each of the plurality of steel plates.

16 Claims, 30 Drawing Sheets

(56) References Cited

U.S. PATENT DOCUMENTS

| | | | |
|---|---|---|---|
| 2008/0296983 | A1 | 12/2008 | Watson |
| 2015/0235749 | A1 | 8/2015 | Huang et al. |
| 2015/0248959 | A1 | 9/2015 | Hamelinck et al. |
| 2019/0214179 | A1 | 7/2019 | Pyrhönen et al. |

FOREIGN PATENT DOCUMENTS

| | | | |
|---|---|---|---|
| DE | 2743148 | A1 | 4/1979 |
| JP | 2012119698 | A | 6/2012 |
| KR | 1020040008090 | A | 1/2004 |
| WO | 2019065002 | A1 | 4/2019 |

OTHER PUBLICATIONS

Office Action issued in Taiwanese Appln. No. 112114492 dated Apr. 16, 2025.

Communication Pursuant to Article 94(3) EPC issued in European Appln. No. 23168207.1 mailed May 14, 2025.

Hiroyuki et al. "FEM Computation of Magnetic Field and Iron Loss in Laminated Iron Core Using Homogenization Method." The Institute of Electrical and Electronics Engineers Transactions on Magnetics, vol. 43, No. 4, Apr. 2007.

* cited by examiner

ELECTROMAGNETIC DEVICE, ALIGNMENT APPARATUS, AND ARTICLE MANUFACTURING METHOD

BACKGROUND OF THE INVENTION

Field of the Invention

The present invention relates to an electromagnetic device, an alignment apparatus, and an article manufacturing method.

Description of the Related Art

An electromagnetic device such as an electromagnetic actuator can include a first member having a first end face, a second member having a second end face facing the first end face through an air gap, and a coil wound around the first member or the second member. The first member, the second member, and the air gap can constitute a magnetic circuit. In the magnetic circuit, the first member and the second member each can be formed from a laminated body of a plurality of electromagnetic steel plates to suppress the generation of heat caused by an eddy current or reduce the magnetic resistance. If, however, the shape of the magnetic circuit becomes complex, simply using a laminated body of electromagnetic steel plates can be insufficient.

Although Japanese Patent Laid-Open No. 2012-119698 does not disclose a structure in which the first end face of the first member faces the second end face of the second member through the air gap but describes about a reduction in eddy current. More specifically, this patent literature describes a ferromagnetic member constituted by a laminated cylindrical portion made of a ferromagnetic material placed on the center of a core and a laminated ring portion made of a ferromagnetic material placed on the central portion of the laminated cylindrical portion in the axial direction. The laminated cylindrical portion is obtained by laminating thin plates cut from a cylinder in the axial direction. The laminated ring portion is obtained by laminating ring-shaped thin plates.

SUMMARY OF THE INVENTION

The present invention provides a technique advantageous in improving the degree of freedom of the shape of a magnetic circuit.

One of aspect of the present invention provides an electromagnetic device comprising a first member having a first end face, a second member having a second end face facing the first end face through an air gap, and a coil wound around one of the first member and the second member, wherein each of the first member and the second member is formed from a laminated body of a plurality of steel plates, and a magnetic circuit formed from the first member and the second member includes a changing part at which a lamination direction of the laminated body changes at a right angle to generate a magnetic flux along a plane direction of each of the plurality of steel plates.

Further features of the present invention will become apparent from the following description of exemplary embodiments with reference to the attached drawings.

DESCRIPTION OF THE EMBODIMENTS

Figure 1:
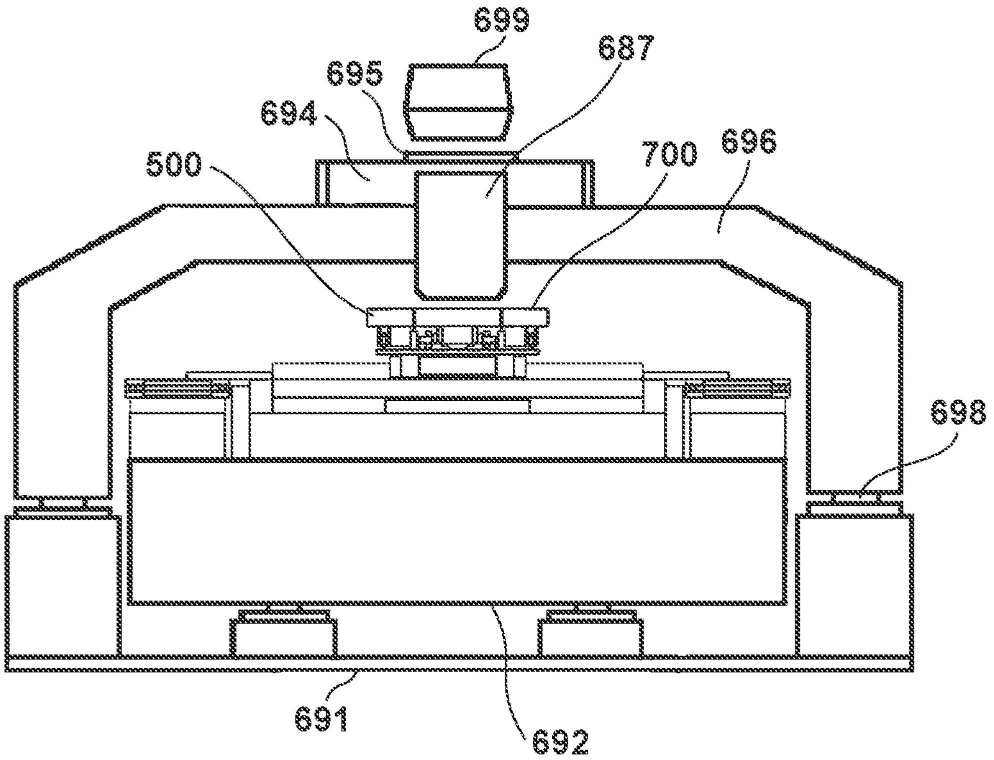
FIG. 1 is a view exemplarily showing the arrangement of an exposure device according to an embodiment.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

In the following description, directions will be described according to an XYZ coordinate system. The X-Y plane defined by the X-axis and the Y-axis is typically a horizontal plane. The Z-axis is typically parallel to the vertical direction. The XY directions are parallel to the X-Y plane. The X-axis direction is a direction parallel to the X-axis. The Y-axis direction is a direction parallel to the Y-axis. The Z-axis direction is parallel to the Z-axis.

FIG. 1 exemplarily shows the arrangement of an exposure device according to an embodiment. The exposure device may be understood as an example of an alignment apparatus that relatively aligns a first object (for example, a substrate) with a second object (for example, an original) or a transfer apparatus that transfers the pattern of an original (reticle) onto a substrate (wafer). A wafer stage device 500 can be placed on a stage base 692 placed on a floor 691 through a mount 698. An optical barrel base 696 can be placed on the floor 691 through the mount 698. The optical barrel base 696 can support a projection optical system 687 and a reticle base 694. A reticle stage device 695 can be placed on the reticle base 694. An illumination optical system 699 can be placed above the reticle base 694. The illumination optical system 699 projects an image of a reticle placed on the reticle stage of the reticle stage device 695 onto a wafer placed on the wafer stage of the wafer stage device 500. This can transfer the pattern of the reticle onto the wafer. The exposure device may be configured as a scanning exposure device.

The wafer stage device 500 can be understood as a first positioning mechanism that positions a substrate as a first object. The reticle stage device 695 can be understood as a second positioning mechanism that positions a reticle as a second object. At least one of the first and second positioning mechanisms can include an electromagnetic device (to be described below).

The above exposure device or transfer device can be used in an article manufacturing method of manufacturing an article such as a semiconductor device. The article manufacturing method can include a transfer step of transferring the pattern of an original onto a substrate by using the above exposure device or transfer device and a step of obtaining an article by processing the substrate through the transfer step. The processing for the substrate can include, for example, etching, deposition, and dicing.

Figure 2:
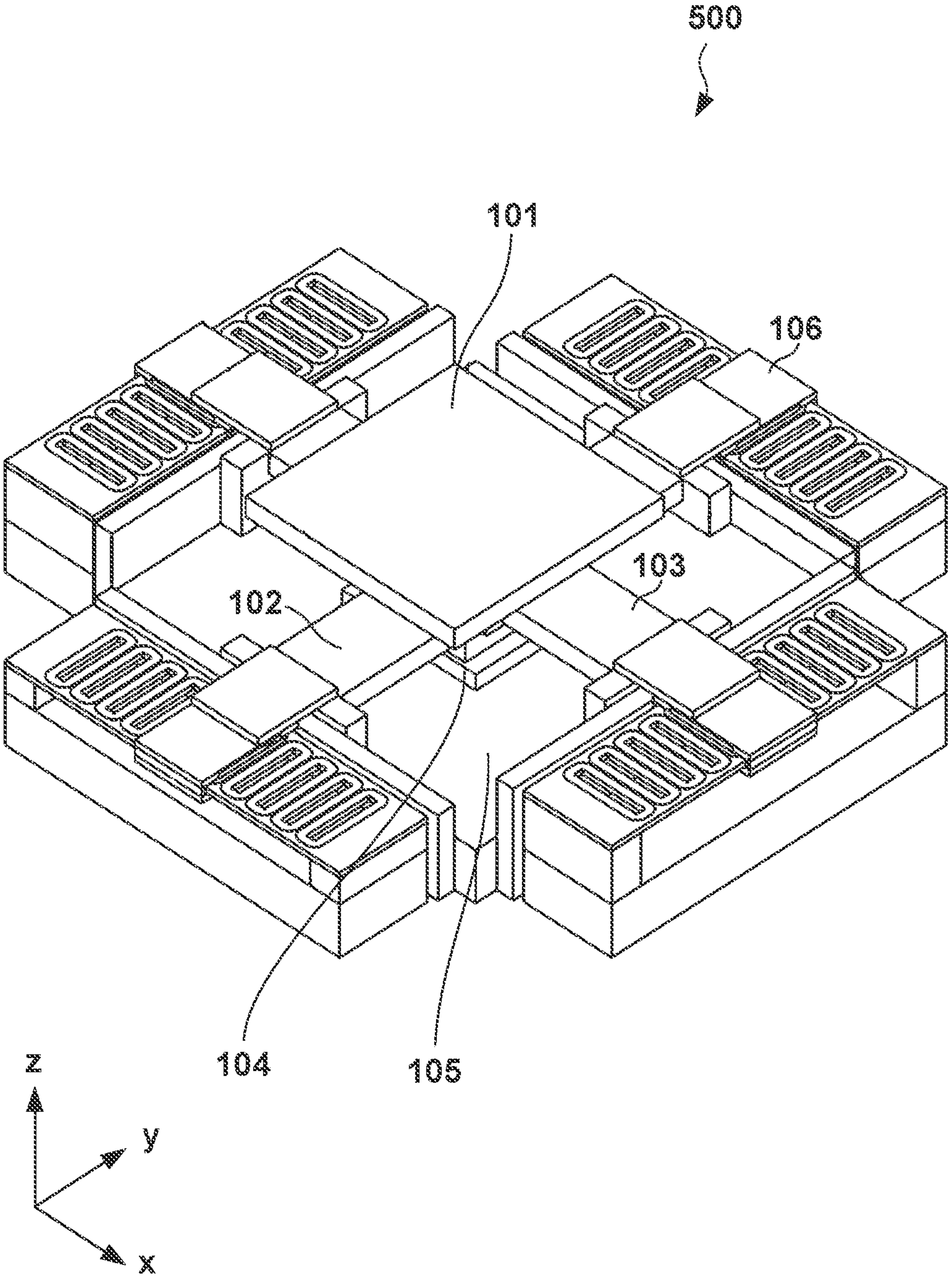
FIG. 2 is a view exemplarily showing the arrangement of a wafer stage device according to an embodiment.

FIG. 2 exemplarily shows the overall arrangement of the wafer stage device 500. An XY slider 104 can be placed on a stage base 105 so as to be freely slidable in the XY directions. An X slider 102 transmits a force in the X-axis direction to the XY slider 104. AY slider 103 transmits a force in the Y-axis direction to the XY slider 104. A fine motion stage device 101 can be mounted on the XY slider 104. The X slider 102 and the Y slider 103 each are provided with, on its both sides, coarse motion linear motors 106 that drive the respective sliders in the X-axis direction and the Y-axis direction.

Figure 3:
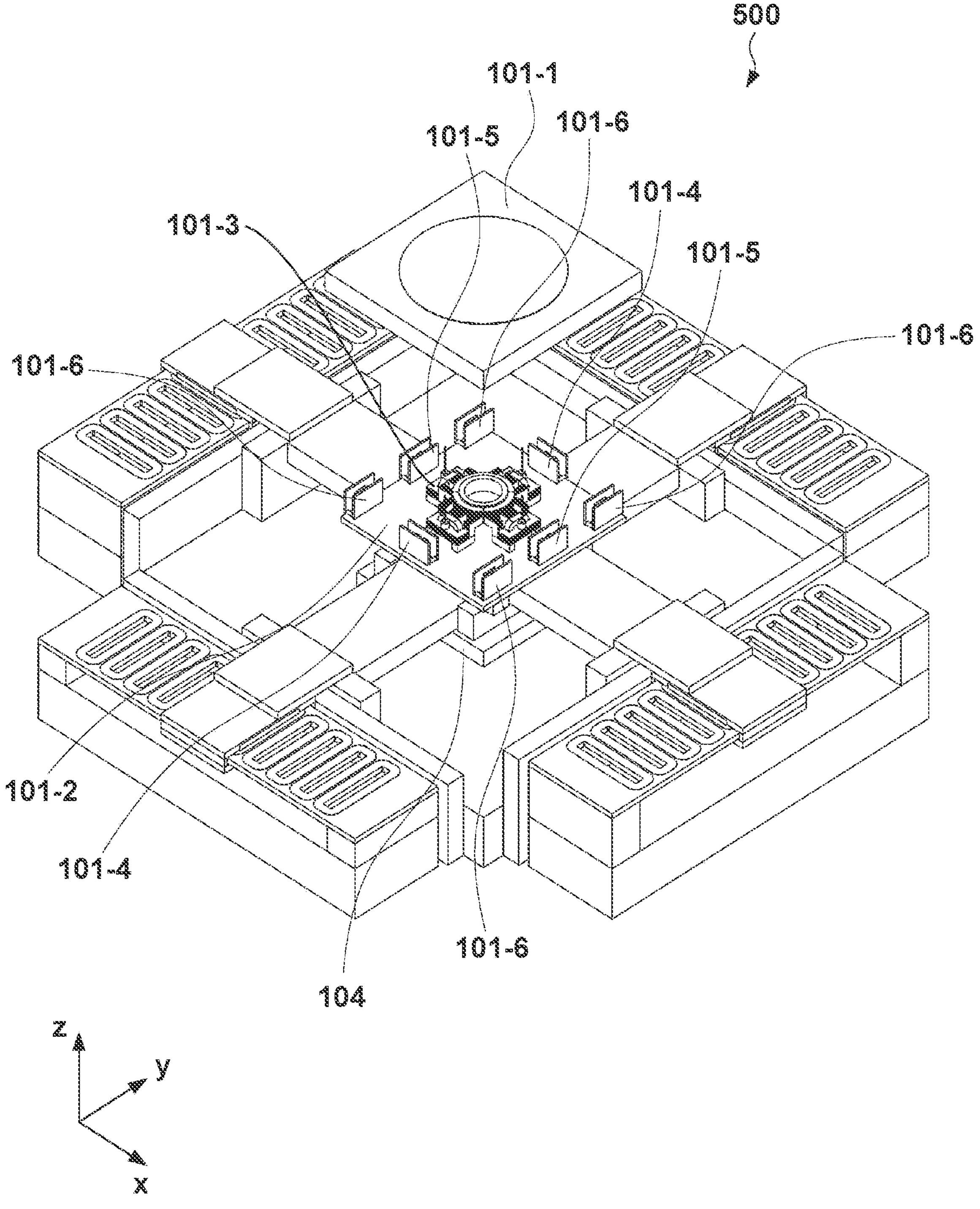
FIG. 3 is a view exemplarily showing the arrangement of a wafer stage device according to an embodiment.

FIG. 3 exemplarily shows a state in which a fine motion stage (fine motion top plate) 101-1 of the fine motion stage device 101 is moved above for convenience sake in the wafer stage device 500. A fine motion base 101-2 can be fixed on the XY slider 104. Four fine motion ZLMs 101-6 that perform precise positioning for Z-tilt can be provided on the fine motion base 101-2. Two fine motion XLMs 101-4 that perform precise positioning around the X-axis and the Z-axis and two fine motion YLMs 101-5 that perform precise positioning around the Y-axis and the Z-axis can be provided on the fine motion base 101-2. A fine motion electromagnet 101-3 that functions to transfer, to the fine motion base 101-2, accelerating forces in the X-axis and Y-axis directions to be applied to the XY slider 104 can be provided on a central portion of the fine motion base 101-2.

Figure 4:
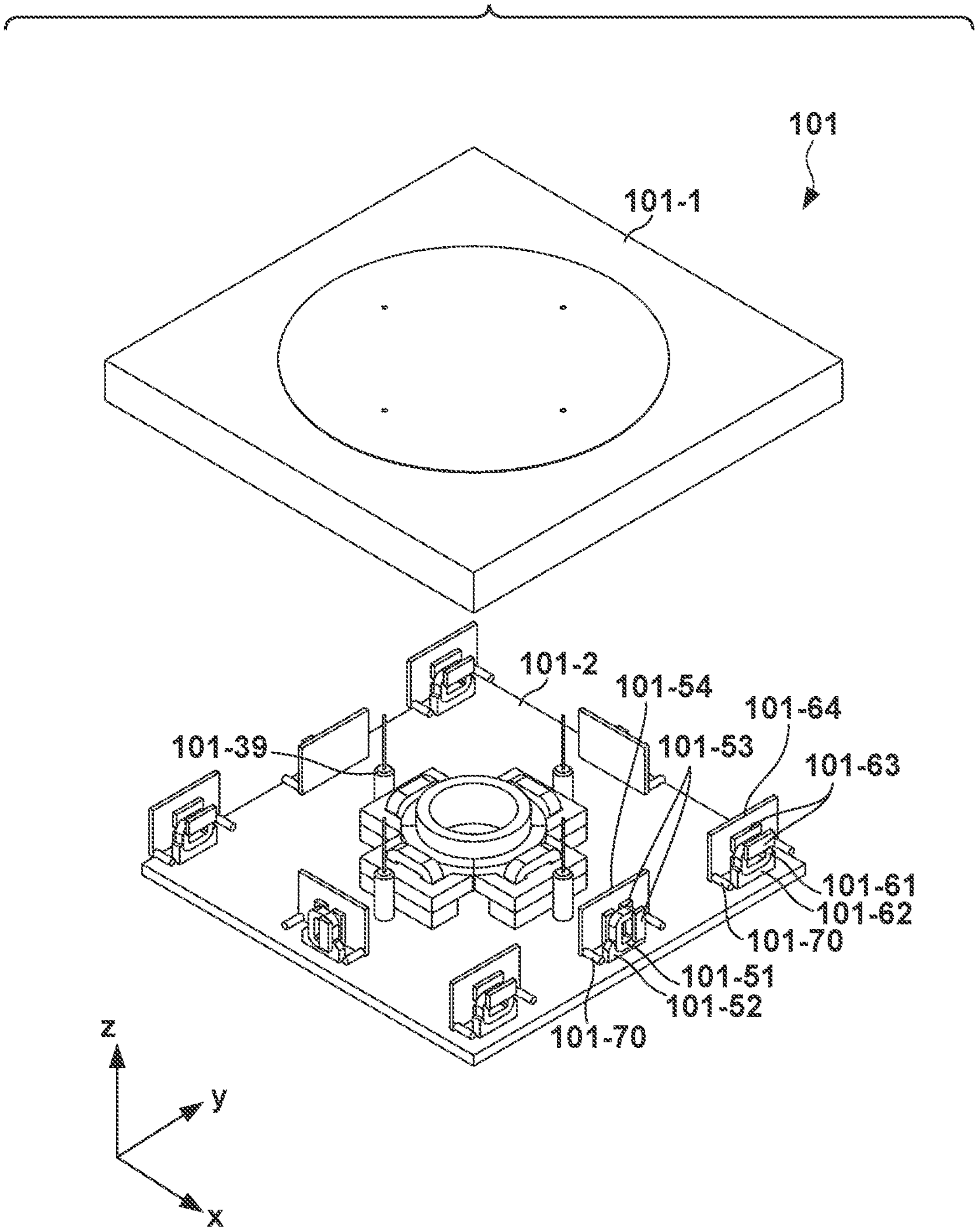
FIG. 4 is a view exemplarily showing the arrangement of a fine motion stage device according to an embodiment.

FIG. 4 exemplarily shows the arrangement of the fine motion stage device 101, specifically detailed examples of the arrangements of the fine motion YLMs 101-5 and the fine motion ZLMs 101-6. Note that FIG. 4 shows a state in which part of each yoke is removed. The fine motion YLM 101-5 can be formed from a linear motor. Each fine motion YLM 101-5 can include a fine motion YLM coil base 101-52, a fine motion YLM coil 101-51, fine motion YLM magnets 101-53, fine motion YLM yokes 101-54, and fine motion LM spacers 101-70. The fine motion YLM coil base 101-52 can be fixed on the fine motion base 101-2, and the fine motion YLM coil 101-51 can be fixed on the fine motion YLM coil base 101-52. The fine motion YLM coil 101-51 may be an oval coil having a straight part extending in the vertical direction, and the four fine motion YLM magnets 101-53 can be placed through an air gap so as to face the straight part. The two fine motion YLM yokes 101-54 for passing magnetic fluxes can be placed so as to sandwich these magnets. The magnetization direction of each magnet may be the X-axis direction. The magnets adjacent to each other in the Y-axis direction may have opposite polarities. The magnets arranged in the X-axis direction may have the same polarity. The fine motion LM spacers 101-70 can be used to hold the positions of one pair of magnets and one pair of yokes against the attraction forces acting on them. The magnets, the yokes, and the spacers can be fixed on the fine motion base 101-2. Making a current flow in the fine motion YLM coil 101-51 can generate a force proportional to the current in a direction orthogonal to the straight part, that is, the Y-axis direction. In addition, making currents flow in the two fine motion YLMs 101-5 in opposite directions can generate a moment around the Z-axis.

Each fine motion ZLM 101-6 can be formed from a linear motor. The fine motion ZLM 101-6 can include a fine motion ZLM coil base 101-62, a fine motion ZLM coil 101-61, fine motion ZLM magnets 101-63, fine motion ZLM yokes 101-64, and fine motion LM spacers 101-70. The fine motion ZLM coil base 101-62 can be fixed on the fine motion base 101-2, and the fine motion ZLM coil 101-61 can be fixed on the fine motion ZLM coil base 101-62. The fine motion ZLM coil 101-61 may be an oval coil having a straight part extending in the horizontal direction, and the four fine motion ZLM magnets 101-63 can be placed through an air gap so as to face the straight part. The two ZLM yokes 101-64 for passing magnetic fluxes can be placed so as to sandwich these magnets. The magnetization direction of each magnet may be the X-axis direction. The magnets adjacent to each other in the Z-axis direction may have opposite polarities. The magnets arranged in the X-axis direction may have the same polarity. The fine motion LM spacers 101-70 can be used to hold the positions of one pair of magnets and one pair of yokes against the attraction forces acting on them. The magnets, the yokes, and the spacers can be fixed on the fine motion top plate 101. Making a current flow in the ZLM coil 101-61 can generate a force proportional to the current in a direction orthogonal to the straight part, that is, the Z-axis direction. In addition, combining the directions of currents flowing in the four fine motion ZLMs 101-6 can generate a moment around the X-axis and a moment around the Y-axis.

Each fine motion XLM 101-4 has the same arrangement as that of the fine motion YLM 101-5, which is equivalent to the arrangement of the fine motion YLM 101-5 that is rotated through 90°. This makes it possible to generate a force in the X-axis direction and a moment around the Z-axis.

In addition, four pin units 101-39 may be provided, which can function as a temporary placement location when a wafer is recovered from the fine motion stage 101-1 and a wafer is placed on the fine motion stage 101-1. In order to stably temporarily place a wafer, the number of pin units 101-39 is preferably three or more. However, at least one pin unit 101-39 allows delivery of a wafer. Each pin unit 101-39 has an elevating mechanism that raises and lowers the pin on which a wafer is temporarily placed or placed. The pin unit 101-39 can have a function that drives the pin into a first state in which the upper end of the pin protrudes from the upper surface of the fine motion stage 101-1 and also drives the pin into a second state in which the upper end of the pin retreats downward from the upper surface of the fine motion stage 101-1. In the operation of placing a wafer on the fine motion stage 101-1, the pin units 101-39 receive the wafer from a conveyance mechanism (not shown) and then transfer the wafer on the pins to the fine motion stage 101-1 in the process of shifting to the second state. In the operation of transferring the wafer placed on the fine motion stage 101-1 to the conveyance mechanism (not shown), the pin units 101-39 shift the pins from the second state to the first state. In this process, the pin units 101-39 receive the wafer placed on the fine motion stage 101-1 and transfer the wafer to the conveyance mechanism (not shown) in the first state.

The fine motion stage device 101 may not include the pin units 101-39. In this case, the fine motion stage device 101 can receive and transfer a wafer from and to the conveyance mechanism (not shown) by causing the fine motion ZLMs 101-6 to drive the fine motion stage 101-1 upward.

Figure 5:
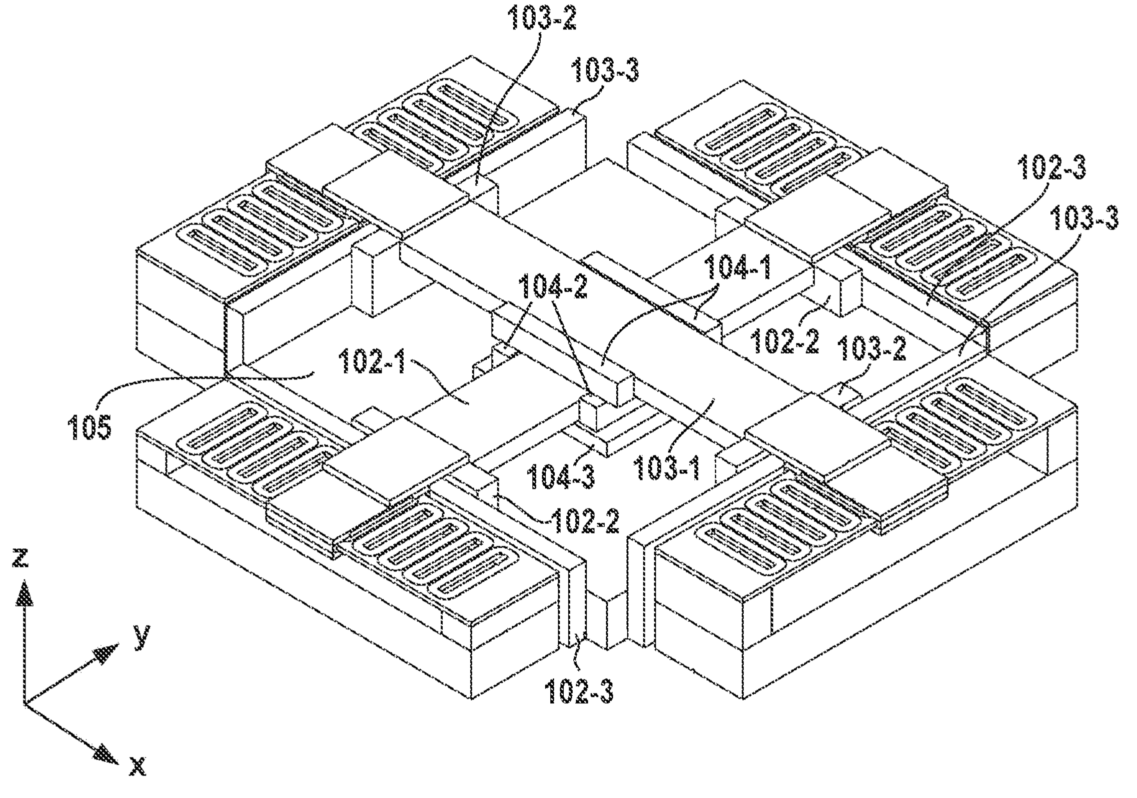
FIG. 5 is a view exemplarily showing the arrangement of a coarse motion stage device according to an embodiment.

FIG. 5 exemplarily shows the detailed arrangement of the coarse motion stage device, specifically the X slider 102, the Y slider 103, and the XY slider 104. The XY slider 104 can include an XY slider lower component 104-3, an XY slider intermediate component 104-2, and an XY slider upper component 104-1. The XY slider lower component 104-3 can be supported on the stage base 105 so as to be freely slidable in the XY directions. The XY slider intermediate component 104-2 can be placed on the XY slider lower component 104-3. The XY slider upper component 104-1 can be placed on the XY slider intermediate component 104-2.

The X slider 102 can include an X beam 102-1, two X feet 102-2, and two X yaw guides 102-3. The two X yaw guides 102-3 can be fixed to two side surfaces of the stage base 105. The two X feet 102-2 can be coupled to each other by the X beam 102-1. One X foot 102-2 can be supported so as to be freely slidable in the X-axis direction while facing a side surface of one X yaw guide 102-3 and the upper surface of the stage base 105 through air gaps. The other X foot 102-2 can be supported so as to be freely slidable in the X-axis direction while facing a side surface of the other X yaw guide 102-3 and the upper surface of the stage base 105 through air gaps. This makes it possible to place the integrated structure of the X beam 102-1 and the two X feet 102-2 so as to be freely slidable in the X-axis direction. In addition, the both side surfaces of the X beam 102-1 face the inner side surface of the XY slider intermediate component 104-2 through a minute air gap so as to be freely slidable and can restrain the XY slider 104 so as to be freely slidable in the XY directions.

The Y slider 103 can include a Y beam 103-1, Y feet 103-2, and Y yaw guides 103-3. The two Y yaw guides 103-3 can be fixed to two side surfaces of the stage base 105. The two Y feet 103-2 can be coupled to each other by the Y beam 103-1. One Y foot 103-2 can be supported so as to be freely slidable in the Y-axis direction while facing a side surface of one Y yaw guide 103-3 and the upper surface of the stage base 105 through air gaps. The other Y foot 103-2 can be supported so as to be freely slidable in the Y-axis direction while facing a side surface of the other Y yaw guide 103-3 and the upper surface of the stage base 105 through air gaps. This makes it possible to place the integrated structure of the Y beam 103-1 and the two Y feet 103-2 so as to be freely slidable in the X-axis direction. In addition, the both side surfaces of the Y beam 103-1 face the inner side surface of the XY slider upper component 104-1 through a minute air gap so as to be freely slidable and can restrain the XY slider 104 so as to be freely slidable in the XY directions.

Figure 6A:
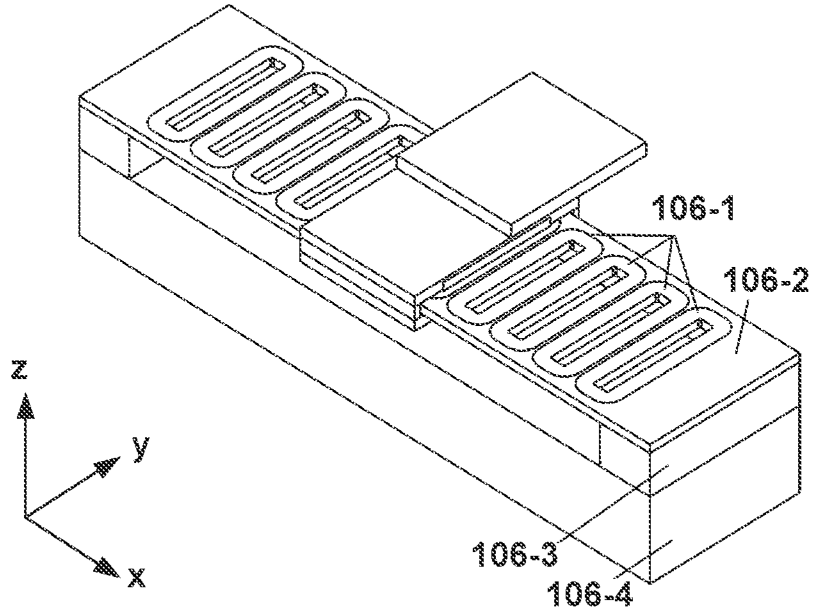
FIGS. 6A and 6B are views exemplarily showing the arrangement of a coarse motion linear motor according to an embodiment.
Figure 6B:
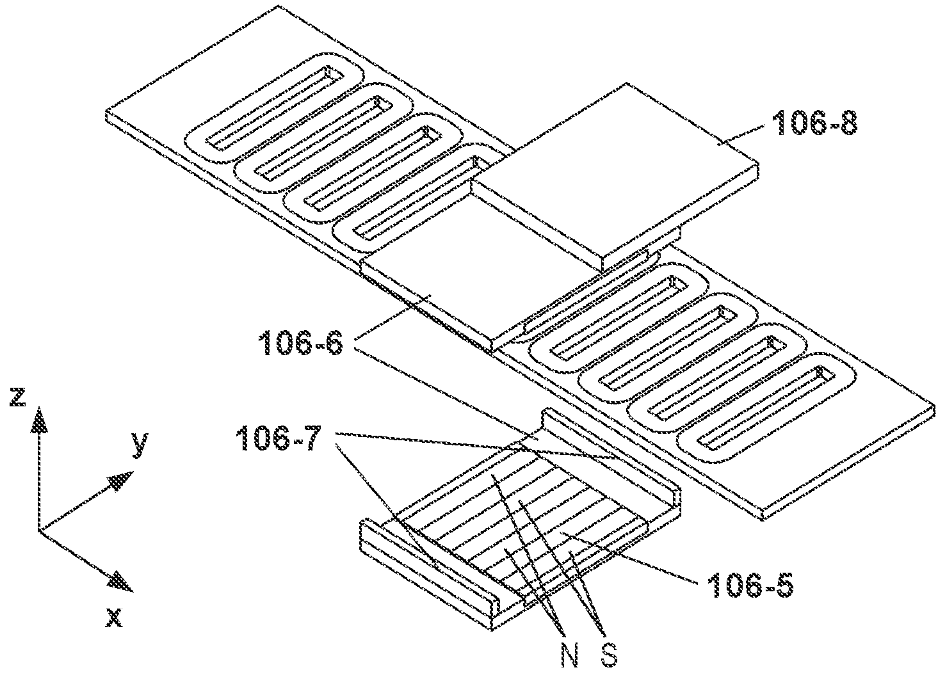

FIGS. 6A and 6B exemplarily show the detailed arrangement of the coarse motion linear motor 106. The coarse motion linear motor 106 can include a plurality of linear motor coils 106-1, a coil support plate 106-2, struts 106-3, a coil base 106-4, two linear motor magnets 106-5, a yoke 106-6, two spacers 106-7, and an arm 106-8.

The plurality of linear motor coils 106-1 can be a two-phase coil unit including the adjacent linear motor coils 106-1 having a phase difference of 90°. The plurality of linear motor coils linear motor coil 106-1 can be fixed to the coil support plate 106-2 and can be fixed to the coil base 106-4 through the struts 106-3. The coil base 106-4 may be fixed to the stage base 692 or may be supported by the stage base 692 so as to be freely slidable in the coil arranging direction. The arrangement in which the coil base 106-4 is supported so as to be freely slidable can absorb reaction to acceleration. The two linear motor magnets 106-5 each may be a tetrapolar magnet unit. These magnets can be placed to vertically sandwich the linear motor coil linear motor coil 106-1 through air gaps.

The yoke 106-6 can be placed on the reverse side of each linear motor magnet 106-5. The spacers 106-7 can be used to keep the gap between the two linear motor magnets 106-5 against an attraction force. The structure constituted by the linear motor magnets 106-5, the yokes 106-6, and the spacers 106-7 can be fixed to the X foot 102-2 or the Y foot

103-2 through the arm 106-8. This structure can give thrust forces in the X-axis direction and the Y-axis direction to the integrated structure of the X beam and the two X feet or the integrated structure of the Y beam and the two Y feet. In addition, this arrangement can continuously generate a force by supplying a sinusoidal current to one of the two-phase coils which faces the magnet in accordance with the position.

Figure 7:
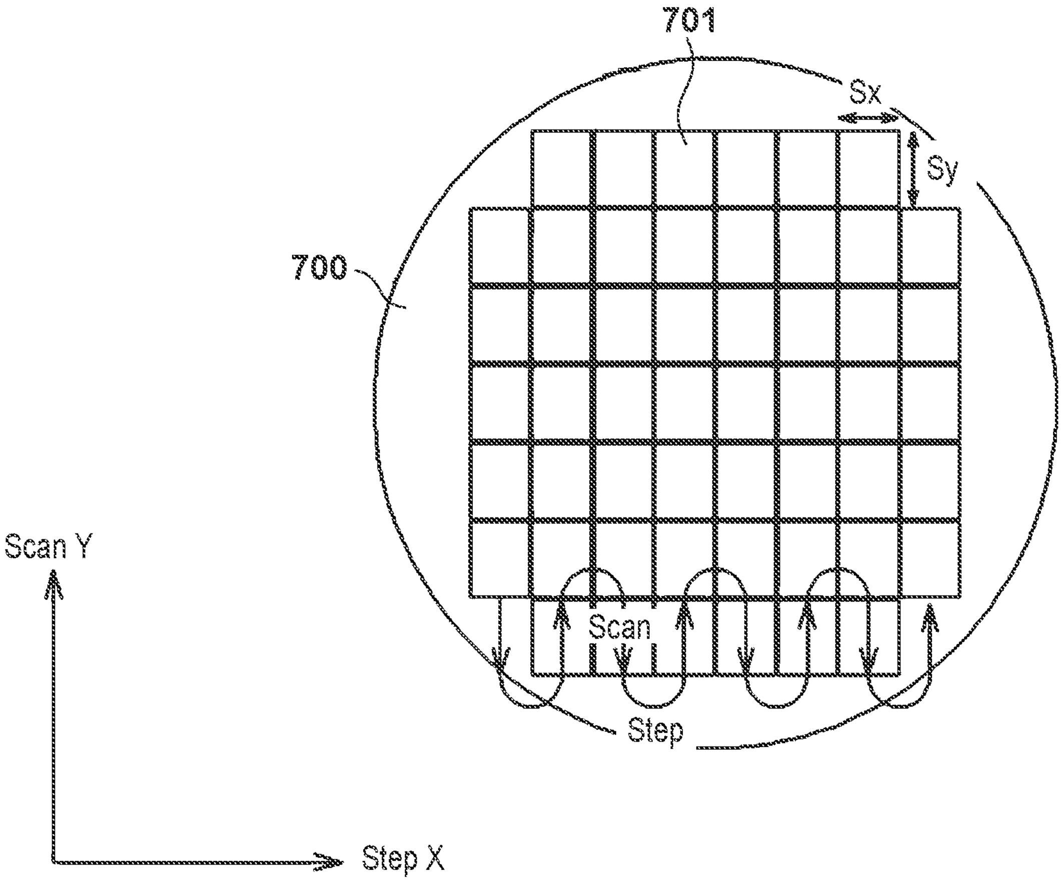
FIG. 7 is a view exemplarily showing a shot layout diagram.

FIG. 7 exemplarily shows a shot layout diagram indicating the array of a plurality of shot regions on a wafer 700. Shot regions 701 each having a size Sx in the X-axis direction and a size Sy in the Y-axis direction can be placed on the wafer 700. For example, scan exposure is performed with respect to the plurality of shot regions 701 along a step-scan path. At the time of scan exposure, the fine motion stage 101-1 can perform scan driving by a scan amount corresponding to 1/projection magnification of the scan amount of the reticle stage in the Y-axis direction in synchronism with the reticle stage. Upon completion of the scan exposure, the fine motion stage 101-1 can perform scan exposure with respect to a next short region by stepping in the X-axis direction while making a U-turn in the Y-axis direction. The acceleration of the fine motion stage 101-1 is performed by using the electromagnets and position control of the stage is performed by using the linear motors, thereby implementing both accurate position control and low heat generation.

When the fine motion stage 101-1 is accelerated, a moment can act on the fine motion stage 101-1. If the fine motion ZLM 101-6 is operated to cancel out such a moment, the heat generated from the fine motion ZLM 101-6 can increase. This heat generation can deform the fine motion stage 101-1. This deformation can cause a deterioration in overlay accuracy.

In order to suppress the generation of heat from the fine motion ZLM 101-6, it is effective to reduce the moment acting on the fine motion stage 101-1 at the time of acceleration of the fine motion stage 101-1. In order to reduce the moment acting on the fine motion stage 101-1 when the fine motion stage 101-1 is accelerated, it is effective to reduce the distances between the center of gravity of the fine motion stage 101-1 and the fine motion XLM 101-4, the fine motion YLM 101-5, and the fine motion ZLM 101-6. For this purpose, it is effective to reduce the height of the fine motion electromagnet 101-3 on the fine motion base 101-2.

Figure 26:
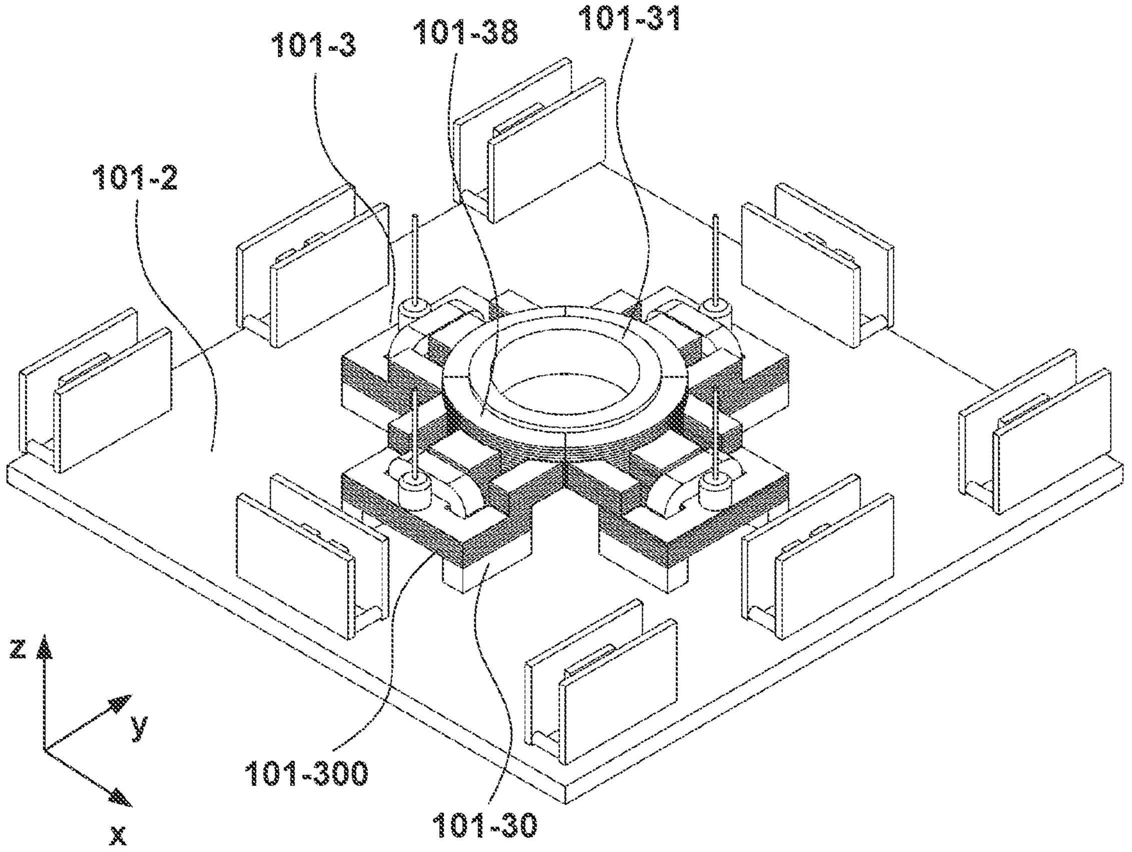
FIG. 26 is a view exemplarily showing the arrangement of a fine motion electromagnet advantageous in reducing the moment acting on a fine motion stage at the time of accelerating the fine motion stage.
Figure 27:
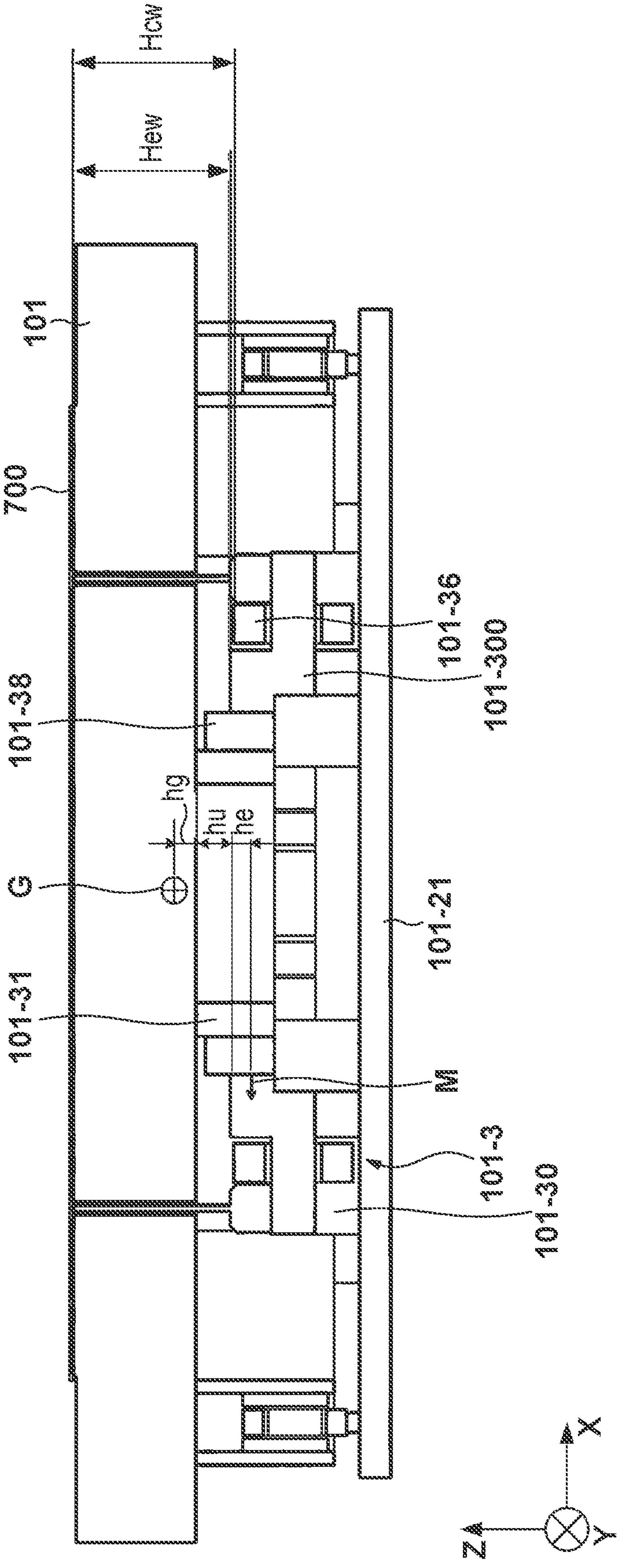
FIG. 27 is a view exemplarily showing the arrangement of a fine motion electromagnet advantageous in reducing the moment acting on a fine motion stage at the time of accelerating the fine motion stage.

FIGS. 26 and 27 exemplarily show the arrangement of the fine motion electromagnet 101-3 which is effective to reduce the moment acting on the fine motion stage 101-1 when the fine motion stage 101-1 is accelerated. The fine motion electromagnet 101-3 can include an E-core 101-300, an E-core support member 101-30 that supports the E-core 101-300, an E-core coil 101-36, an I-core 101-38, and an I-core support member 101-31 that supports the I-core 101-38.

Figure 28:
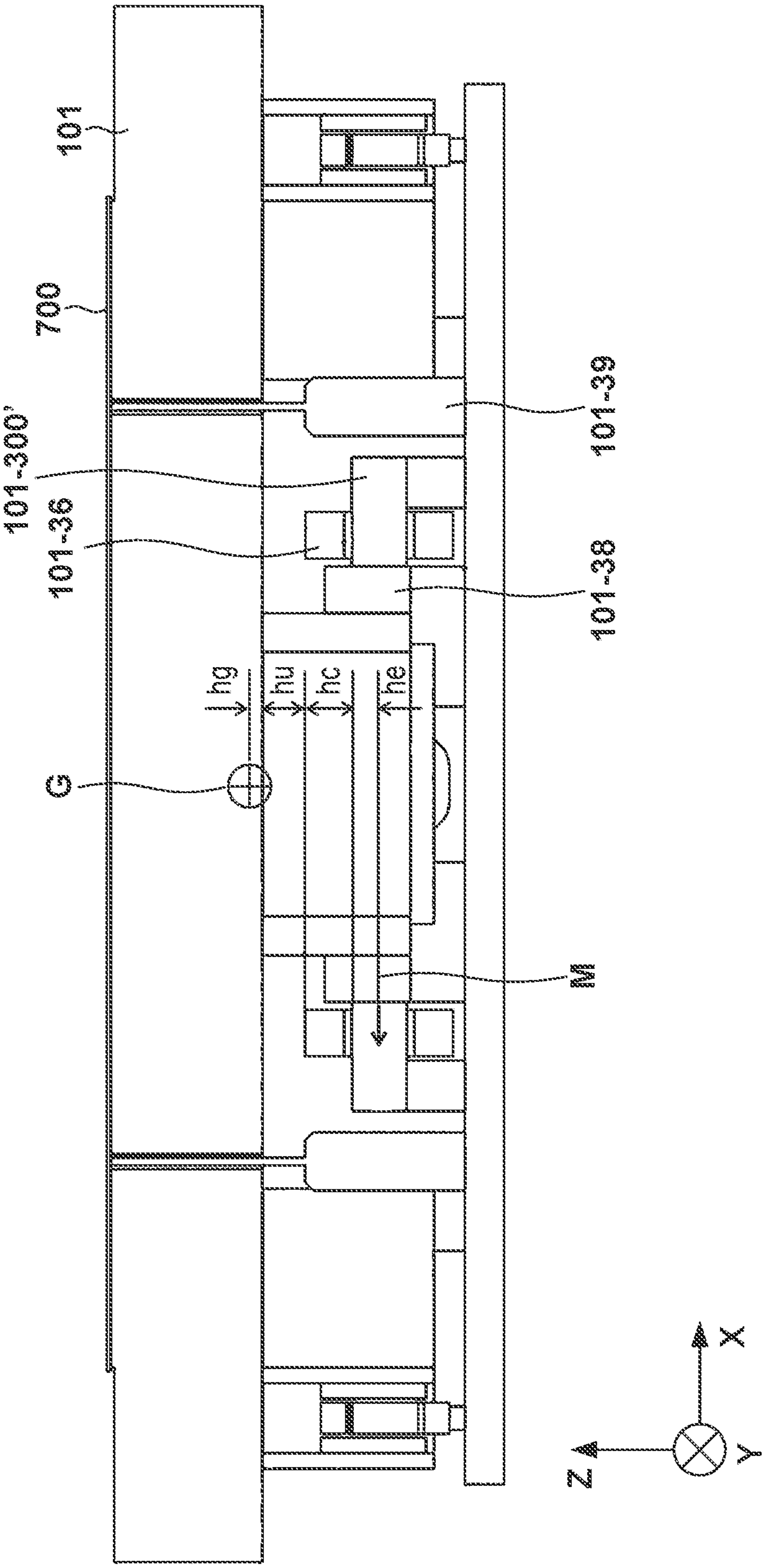
FIG. 28 is a view exemplarily showing the moment acting on a fine motion stage at the time of accelerating the fine motion stage.

In the case shown in FIGS. 26 and 27, the four support members 101-30 can be fixed on the fine motion base 101-2, the E-core 101-300 can be placed on each support member 101-30, and the E-core coil 101-36 can be wound around each E-core 101-300. The E-core 101-300 faces the I-core 101-38 through a minute air gap. The I-core 101-38 can be fixed to the fine motion stage 101-1. The E-core 101-300 has a crank-shaped cross-section. This makes it possible to lower the E-core coil 101-36 in the vertical direction as compared with the arrangement shown in FIGS. 4 and 28. This can reduce the height of the fine motion electromagnet 101-3 on the fine motion base 101-2.

In the arrangement shown in FIGS. 26 and 27, a moment M acting on the fine motion stage 101-1 at the time of accelerating the fine motion stage 101-1 having a mass m at an acceleration rate a, is $M=m\cdot a\cdot(hg+hu+he)$. In contrast to this, in the arrangement shown in FIGS. 4 and 28, the moment M acting on the fine motion stage 101-1 at the time of accelerating the fine motion stage 101-1 having the mass m at the acceleration rate a is $M=m\cdot a\cdot(hg+hu+he+hc)$. Accordingly, the arrangement shown in FIGS. 26 and 27 reduces the moment M acting on the fine motion stage 101-1 at the time of accelerating the fine motion stage 101-1 having the mass M at the acceleration rate a by $m\cdot a\cdot hc$ as compared with the arrangement shown in FIGS. 4 and 28. This can reduce the heat generated by the fine motion ZLM 101-6 by operating the fine motion ZLM 101-6 to cancel out the moment. This is effective to suppress the deformation of the fine motion stage 101-1 and further suppress a reduction in overlay accuracy. Note that hg represents the Z-axis direction distance between a center of gravity G of the structure constituted by the fine motion stage 101-1 and the constituent elements (a movable iron core MC, the support member 101-31, and the like) that move together with the fine motion stage 101-1 and the lower surface of the fine motion stage 101-1 (the surface on the fine motion base 101-2 side), hu represents the Z-axis direction distance between the lower surface of the fine motion stage 101-1 and the upper end (the end on the fine motion stage 101-1 side) of the fine motion electromagnet 101-3, he represents the Z-axis direction distance between the upper end of a fixed iron core SC and the point of action of the fine motion electromagnet 101-3, and hc represents the Z-axis direction distance between the upper end of the E-core coil 101-36 (the end on the fine motion stage 101-1 side) and the upper end of the fixed iron core SC.

Figure 29:
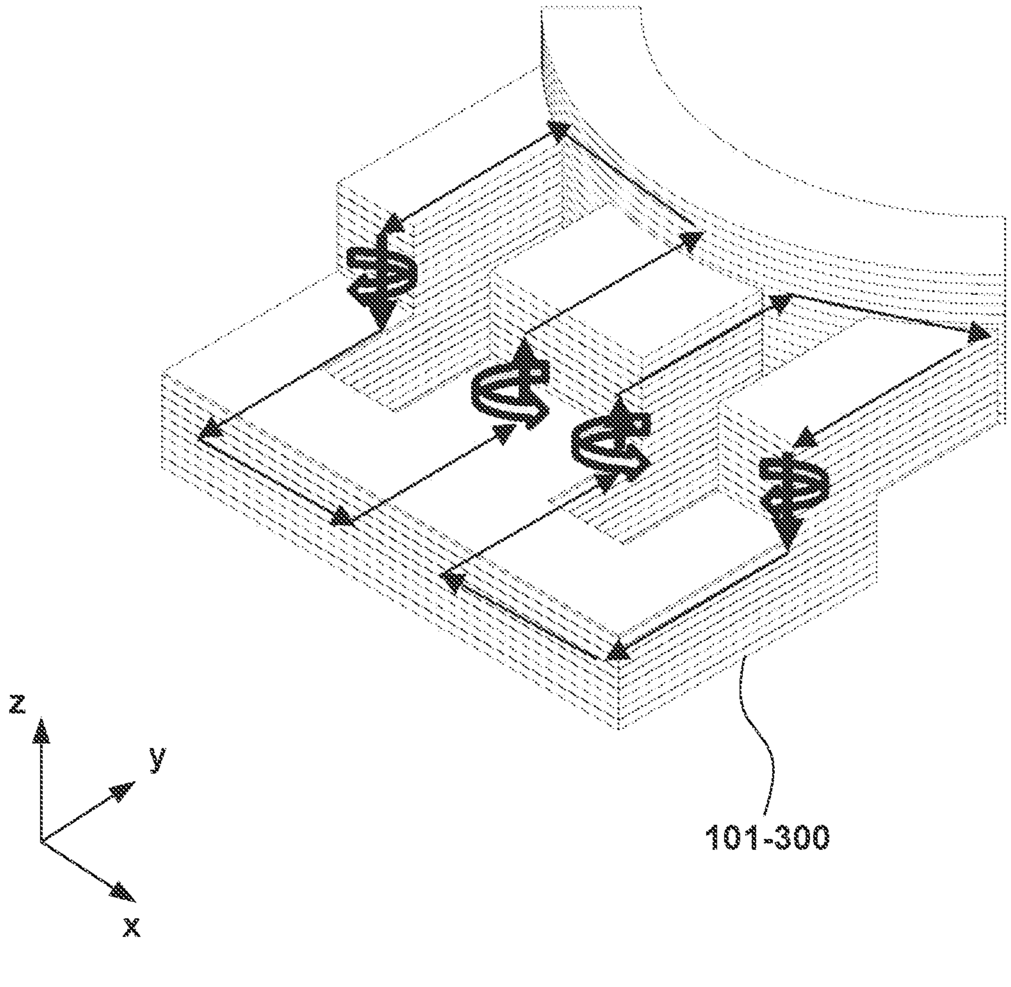
FIG. 29 is a view for explaining eddy currents generated in an iron core having a complex three-dimensional shape.

FIG. 29 shows an example of the arrangement of the E-core 101-300. In the case shown in FIG. 29, the E-core 101-300 is formed from a laminated body of a plurality of electromagnetic steel plates. The lamination direction is the Z-axis direction. Each electromagnetic steel plate is covered by an insulating film. Referring to FIG. 29, the directions of magnetic fluxes in the magnetic circuit are indicated by black arrows, and the magnetic fluxes flow through three-dimensional routes. The magnetic fluxes flowing the Z-axis direction are indicated by the thick black arrows. Since the directions indicated by the thick black arrows are parallel to the normal direction of the electromagnetic steel plates, the eddy currents generated by changes in current flow along the surfaces of the electromagnetic steel plates, and nothing suppresses the currents. Accordingly, as indicated by the outline thick arrows, large eddy currents can be generated. This makes the E-core 101-300 generate heat. This heat is transmitted to the fine motion stage 101-1 to deform the fine motion stage 101-1. This can cause a deterioration in overlay accuracy. In addition, the magnetic fluxes in the Z-axis direction indicated by the thick black arrows are parallel to the normal direction of the electromagnetic steel plates. This can lead to disadvantages such as an increase in magnetic resistance, a reduction in magnetic flux value, and a reduction in attraction force.

A preferred example of the arrangement of the fine motion electromagnet 101-3 will be described below. Although the following will exemplify a case in which the electromagnetic device according to the present invention is applied to the fine motion electromagnet 101-3, the electromagnetic device according to the present invention can also be applied to an electromagnetic device in another form, in particular an electromagnetic device in which the flowing directions of magnetic fluxes in the magnetic circuit can change in a three-dimensional manner.

Figure 8A:
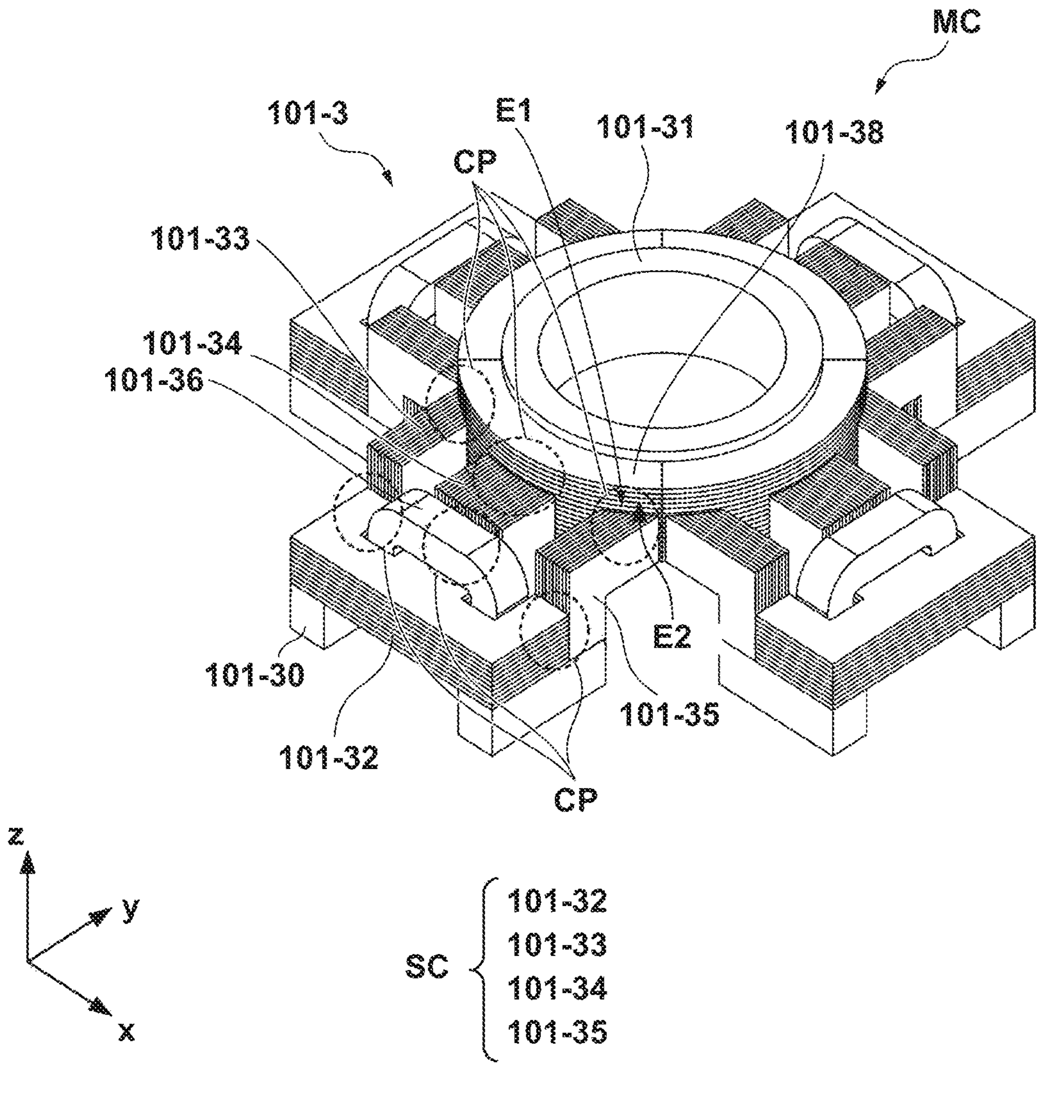
FIG. 8A is a view exemplarily showing the arrangement of a fine motion electromagnet according to the first embodiment.
Figure 8B:
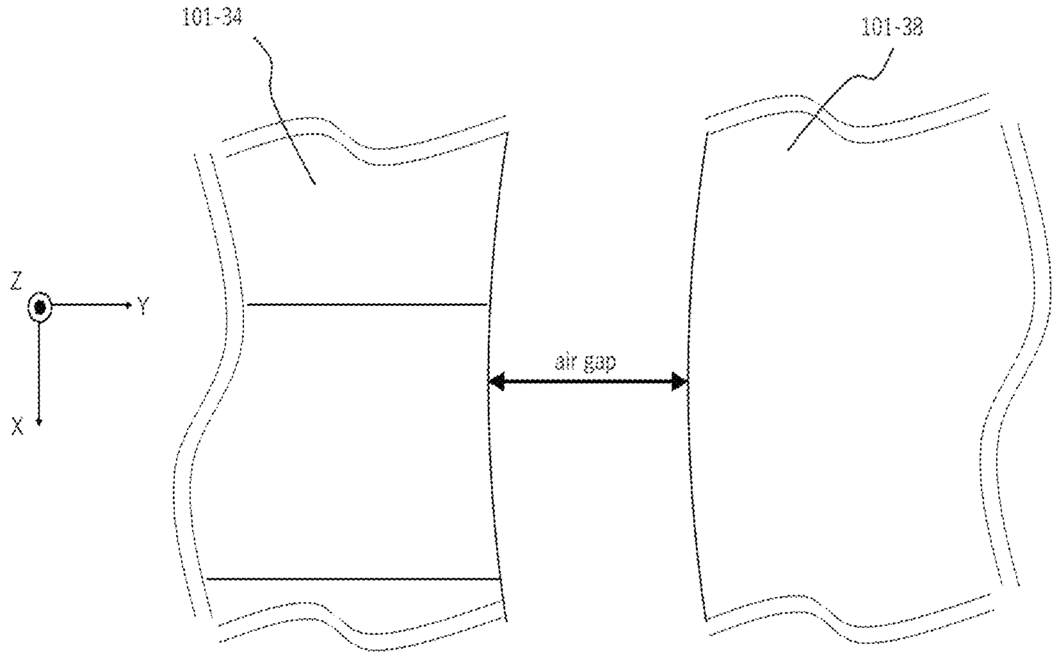
FIG. 8B is a view exemplarily showing an air gap.

FIG. 8A exemplarily shows the arrangement of the fine motion electromagnet 101-3 according to the first embodiment. The fine motion electromagnet 101-3 can include the fixed iron cores (first members) SC, the support members 101-30 that support the fixed iron cores SC, the movable iron core (second member) MC, the support member 101-31 that supports the movable iron core MC, and the E-core coils 101-36. Each fixed iron core (first member) SC can include a first element 101-32, a second element 101-33, a third element 101-34, and a fourth element 101-35. The movable iron core (second member) MC can include an element 101-38 and may include one or a plurality of other elements in addition to the element 101-38. The fixed iron core (first member) SC can include first end faces E1. The movable iron core (second member) MC can include a second end face E2 facing the first end faces E1 through air gaps, as exemplarily shown in FIG. 8B. In this case, the first end faces E1 are respectively provided on the second element 101-33, the third element 101-34, and the fourth element 101-35. The second end face E2 is provided on the element 101-38.

The fixed iron core (first member) SC can be formed from a laminated body of a plurality of electromagnetic steel plates. Each of the electromagnetic steel plates can be covered by an insulating film. In another point of view, the first element 101-32, the second element 101-33, the third element 101-34, and the fourth element 101-35 constituting the fixed iron core (first member) SC each can be formed from a laminated body of a plurality of electromagnetic steel plates. The movable iron core (second member) MC can be formed from a laminated body of a plurality of electromagnetic steel plates. In another point of view, the element 101-38 as at least one element constituting the movable iron core (second member) MC can be formed from a laminated body of a plurality of electromagnetic steel plates. Each of the plurality of electromagnetic steel plates can be covered by an insulating film.

The magnetic circuit constituted by the fixed iron core (first member) SC, the movable iron core (second member) MC, and the air gaps (spaces between the first end faces E1 and the second end face E2) can include at least one changing part CP at which the lamination direction of the laminated body of the plurality of electromagnetic steel plates changes at a right angle. The changing part CP can include a contact portion between a first portion (for example, the first element 101-32) at which the lamination direction is a first direction (for example, the Z-axis direction) and a second portion (for example, the third element 101-34) at which the lamination direction is a second direction (for example, the X-axis direction) orthogonal to the first direction. The changing part CP can include a portion at which the first portion (for example, the first element 101-32) at which the lamination direction is the first direction faces the second portion (for example, the third element 101-34) at which the lamination direction is the second direction orthogonal to the first direction through a solid member. The solid member can be an insulating film that covers each of the plurality of electromagnetic steel plates.

In the case shown in FIG. 8A, the changing part CP is provided on the fixed iron core (first member) SC. In addition, in the case shown in FIG. 8A, the changing part CP includes a portion at which the fixed iron core (first member) SC faces the movable iron core (second member) MC through an air gap. The latter arrangement can be understood as an arrangement in which the first portion of the first portion and the second portion constituting the changing part CP is provided on the fixed iron core (first member) SC, and the second portion is provided for the movable iron core (second member) MC. The changing part CP may be additionally provided for the movable iron core (second member) MC or may be provided for only the movable iron core (second member) MC.

The fixed iron core (first member) SC and the movable iron core (second member) MC each can be formed from at least one stacked iron core. Alternatively, at least one of the fixed iron core (first member) SC and the movable iron core (second member) MC can be formed from a plurality of stacked iron cores. Such a plurality of stacked iron cores can be placed close to each other and fixed with a fixing member. Note that a stacked iron core can be formed by laminating electromagnetic steel plates having the same shape.

The first element 101-32, the second element 101-33, the third element 101-34, and the fourth element 101-35 each can be formed from a stacked iron core. The first element 101-32, the second element 101-33, the third element 101-34, and the fourth element 101-35 may be integrated by using an adhesive material or by being fastened to each other using a clamp component. In this case, at least one changing part CP is provided for the fixed iron core (first member) SC, and the E-core coil 101-36 is wound around the fixed iron core (first member) SC. The E-core coil 101-36 can be wound around a portion different from the portion at which the changing part CP of the fixed iron core (first member) SC is placed. Making a current flow in the coil 101-36 generates an attraction force between the first end face E1 and the second end face E2. In the case shown in FIG. 8A, the first element 101-32 has an E-shape, and the E-core coil 101-36 is wound around the middle tooth of the first element 101-32.

The changing parts CP are provided to prevent magnetic fluxes passing through the magnetic circuit constituted by the fixed iron core (first member) SC, the movable iron core (second member) MC, and the air gaps from flowing in the plurality of electromagnetic steel plates constituting the fixed iron core (first member) SC and the movable iron core (second member) MC in the lamination direction of the electromagnetic steel plates. Alternatively, the changing parts CP, the fixed iron core (first member) SC, and the movable iron core (second member) MC can be provided to make magnetic fluxes passing through the fixed iron core (first member) SC and the movable iron core (second member) MC flow along the plane direction of each electromagnetic steel plate. Alternatively, the changing parts CP can be provided to make the magnetic resistance of the magnetic circuit constituted by the fixed iron core (first member) SC, the movable iron core (second member) MC, and the air gaps become smaller than that in a case without the changing parts CP. Alternatively, the changing parts CP can be provided to make the eddy currents generated in the magnetic circuit constituted by the fixed iron core (first member) SC, the movable iron core (second member) MC, and the air gaps become smaller than that in a case without the changing parts CP.

Forming a magnetic circuit using a core including the changing parts CP is advantageous in improving the degree of freedom of the shape of the magnetic circuit. In addition, forming each of cores such as the fixed iron core (first member) SC and the movable iron core (second member) MC by using a plurality of elements can facilitate manufacturing a core having a complex shape and the work of attaching and replacing coils. In particular, an arrangement configured to fasten a plurality of elements with a clamp member is advantageous in facilitating the work of replacing coils.

Figure 9:
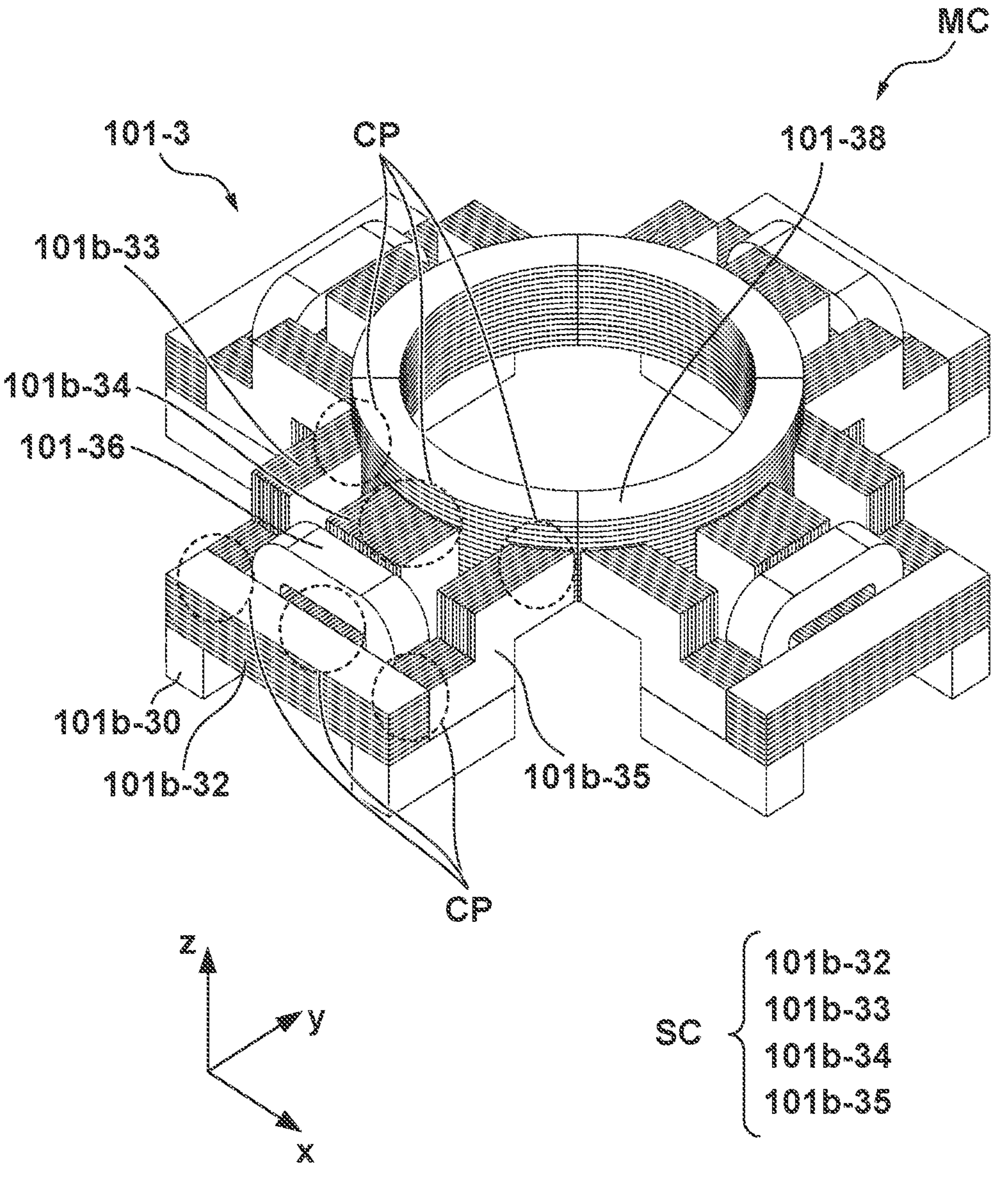
FIG. 9 is a view exemplarily showing the arrangement of a modification of the fine motion electromagnet according to the first embodiment.

FIG. 9 exemplarily shows the arrangement of a modification of the fine motion electromagnet 101-3 according to the first embodiment. Matters which are not referred to as the modification can comply with the arrangement according to the first embodiment shown in FIG. 8A. The fine motion electromagnet 101-3 can include the fixed iron cores (first members) SC, support members 101*b*-30 that support the fixed iron cores (first members) SC, the movable iron core (second member) MC, support members (not shown) that support the movable iron core MC, and the coils 101-36. Each fixed iron core (first member) SC can include a first element 101*b*-32, a second element 101*b*-33, a third element 101*b*-34, and a fourth element 101*b*-35. The movable iron core (second member) MC can include the element 101-38 and may include one or a plurality of other elements in addition to the element 101-38. In the case shown in FIG. 8A, the fixed iron core (first member) SC can have first end faces, and the movable iron core (second member) MC can have a second end face facing the first end faces through an air gap. In this case, the first end faces are respectively provided on the second element 101*b*-33, the third element 101*b*-34, and the fourth element 101*b*-35, and the second end face is provided on the element 101-38. In the modification shown in FIG. 9, the second element 101*b*-33, the third element 101*b*-34, and the fourth element 101*b*-35 each have a crank shape, and the first element 101*b*-32 has a rectangular parallelepiped shape.

Figure 10:
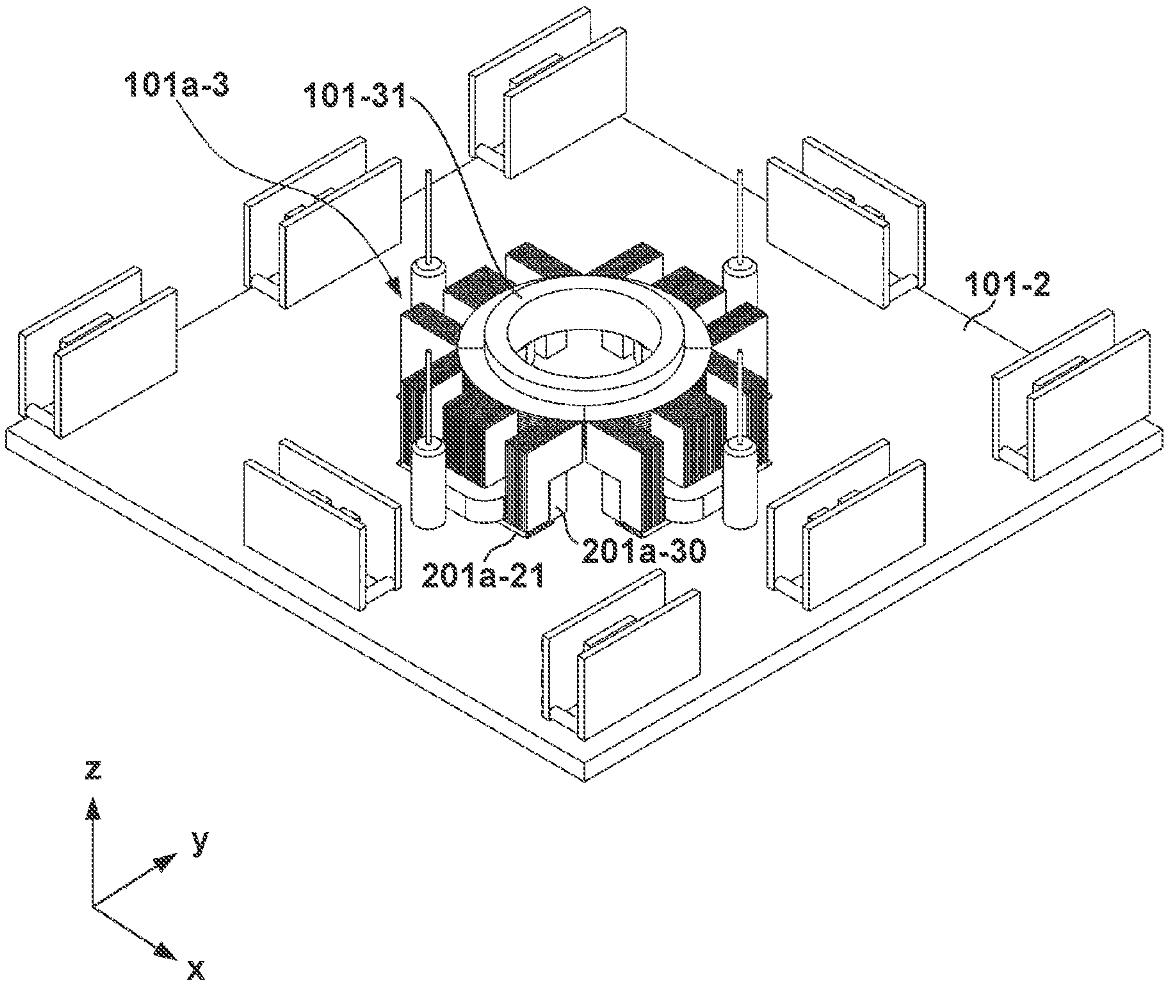
FIG. 10 is a view exemplarily showing the arrangement of a fine motion electromagnet according to the second embodiment.
Figure 11:
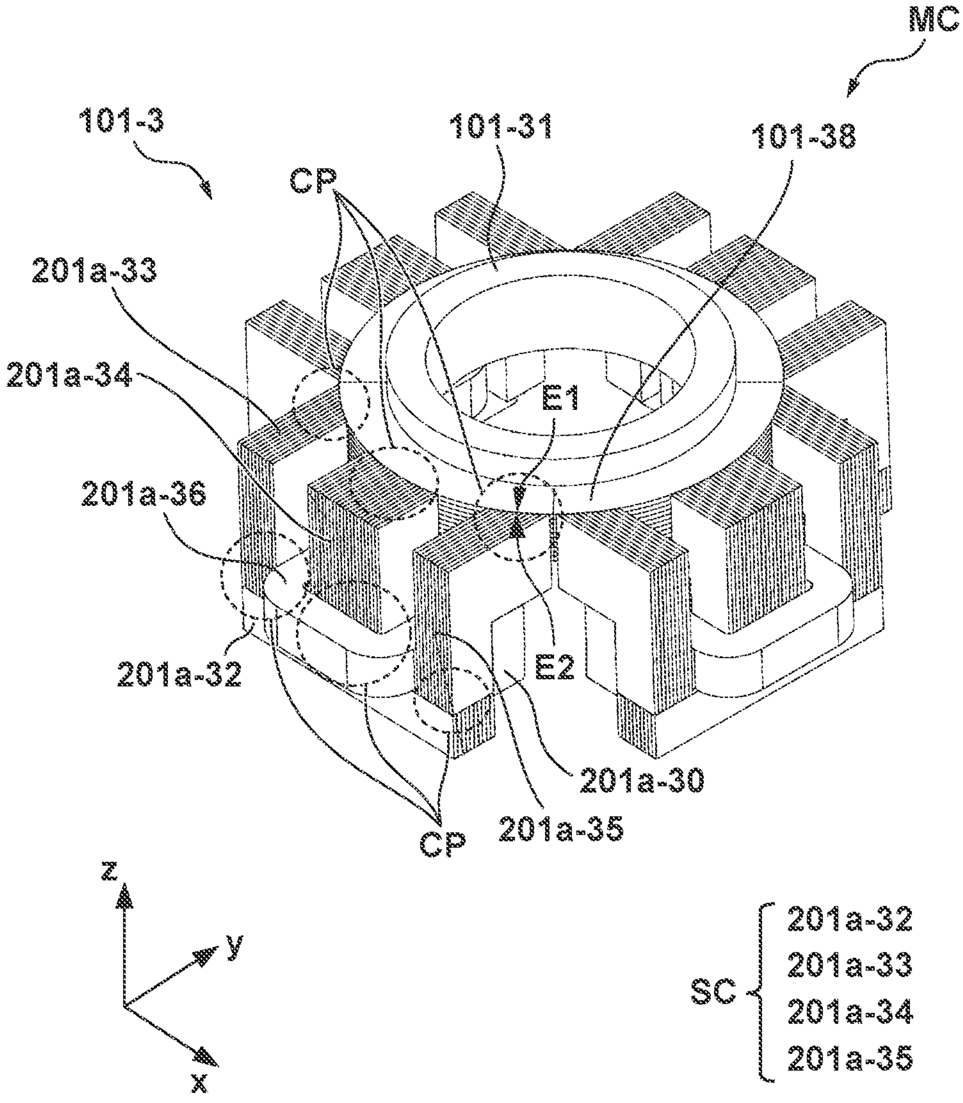
FIG. 11 is a view exemplarily showing the arrangement of the fine motion electromagnet according to the second embodiment.

An exposure device and a fine motion electromagnet 101-3 according to the second embodiment will be described below. Matters which are not referred to as the second embodiment can comply with the arrangement according to the first embodiment. FIGS. 10 and 11 exemplarily show the arrangement of the fine motion electromagnet 101-3 in a wafer stage device 500 of the exposure device according to the second embodiment. Note that FIG. 11 exemplarily shows the arrangement of the fine motion electromagnet 101-3 in a state in which a fine motion base 101-2 is removed.

In the second embodiment, the fine motion base 101-2 can be provided with four openings 201*a*-21, and part of each fine motion electromagnet 101*a*-3 can be placed in a corresponding one of the openings 201*a*-21. Part of each of the four fine motion electromagnets 101*a*-3 may be placed below the fine motion base 101-2. Each fine motion electromagnet 101*a*-3 can be supported by the fine motion base 101-2 through a support member 201*a*-30. Such an arrangement is advantageous in reducing the height of the fine motion electromagnet 101*a*-3 on the fine motion base 101-2 and reducing the dimension of the fine motion electromagnet 101*a*-3 in the XY directions.

The fine motion electromagnet 101-3 can include fixed iron cores (first members) SC, the support members 201*a*-30 that support the fixed iron cores SC, a movable iron core (second member) MC, support members 101-31 that support the movable iron core (second member) MC, and coils 201*a*-36. Each fixed iron core (first member) SC can include a first element 201*a*-32, a second element 201*a*-33, a third element 201*a*-34, and a fourth element 201*a*-35. The movable iron core (second member) MC can include an element 101-38 and may include one or a plurality of other elements in addition to the element 101-38. The fixed iron core (first member) SC can include first end faces E1. The movable iron core (second member) MC can include a second end face E2 facing the first end faces E1 through air gaps. In this case, the first end faces E1 are respectively provided on the second element 201*a*-33, the third element 201*a*-34, and the fourth element 201*a*-35. The second end face E2 is provided on the element 101-38.

The fixed iron core (first member) SC can be formed from a laminated body of a plurality of electromagnetic steel plates. Each of the electromagnetic steel plates can be covered by an insulating film. In another point of view, the first element 201*a*-32, the second element 201*a*-33, the third element 201*a*-34, and the fourth element 201-35 constituting the fixed iron core (first member) SC each can be formed from a laminated body of a plurality of electromagnetic steel plates. The movable iron core (second member) MC can be formed from a laminated body of a plurality of electromagnetic steel plates. In another point of view, the element 101-38 as at least one element constituting the movable iron core (second member) MC can be formed from a laminated body of a plurality of electromagnetic steel plates. Each of the plurality of electromagnetic steel plates can be covered by an insulating film.

The magnetic circuit constituted by the fixed iron core (first member) SC, the movable iron core (second member) MC, and the air gaps (spaces between the first end faces E1 and the second end face E2) can include at least one changing part CP at which the lamination direction of the laminated body of the plurality of electromagnetic steel plates changes at a right angle. The changing part CP can include a contact portion between a first portion (for example, the first element 201*a*-32) at which the lamination direction is a first direction (for example, the Y-axis direction) and a second portion (for example, the third element 201*a*-34) at which the lamination direction is a second direction (for example, the X-axis direction) orthogonal to the first direction. The changing part CP can include a portion at which the first portion (for example, the first element 201*a*-32) at which the lamination direction is the first direction faces the second portion (for example, the third element 201*a*-34) at which the lamination direction is the second direction orthogonal to the first direction through a solid member. The solid member can be an insulating film that covers each of the plurality of electromagnetic steel plates.

In the case shown in FIGS. 10 and 11, the changing part CP is provided on the fixed iron core (first member) SC. In addition, in the case shown in FIGS. 10 and 11, the changing part CP includes a portion at which the fixed iron core (first member) SC faces the movable iron core (second member) MC through an air gap. The latter arrangement can be understood as an arrangement in which the first portion of the first portion and the second portion constituting the changing part CP is provided on the fixed iron core (first member) SC, and the second portion is provided for the movable iron core (second member) MC. The changing part CP may be additionally provided for the movable iron core (second member) MC or may be provided for only the movable iron core (second member) MC. In the case shown in FIGS. 10 and 11, the second element 201*a*-33, the third element 201*a*-34, and the fourth element 201*a*-35 each have an L-shape, and the first element 201*a*-32 has a rectangular parallelepiped shape.

Figure 12:
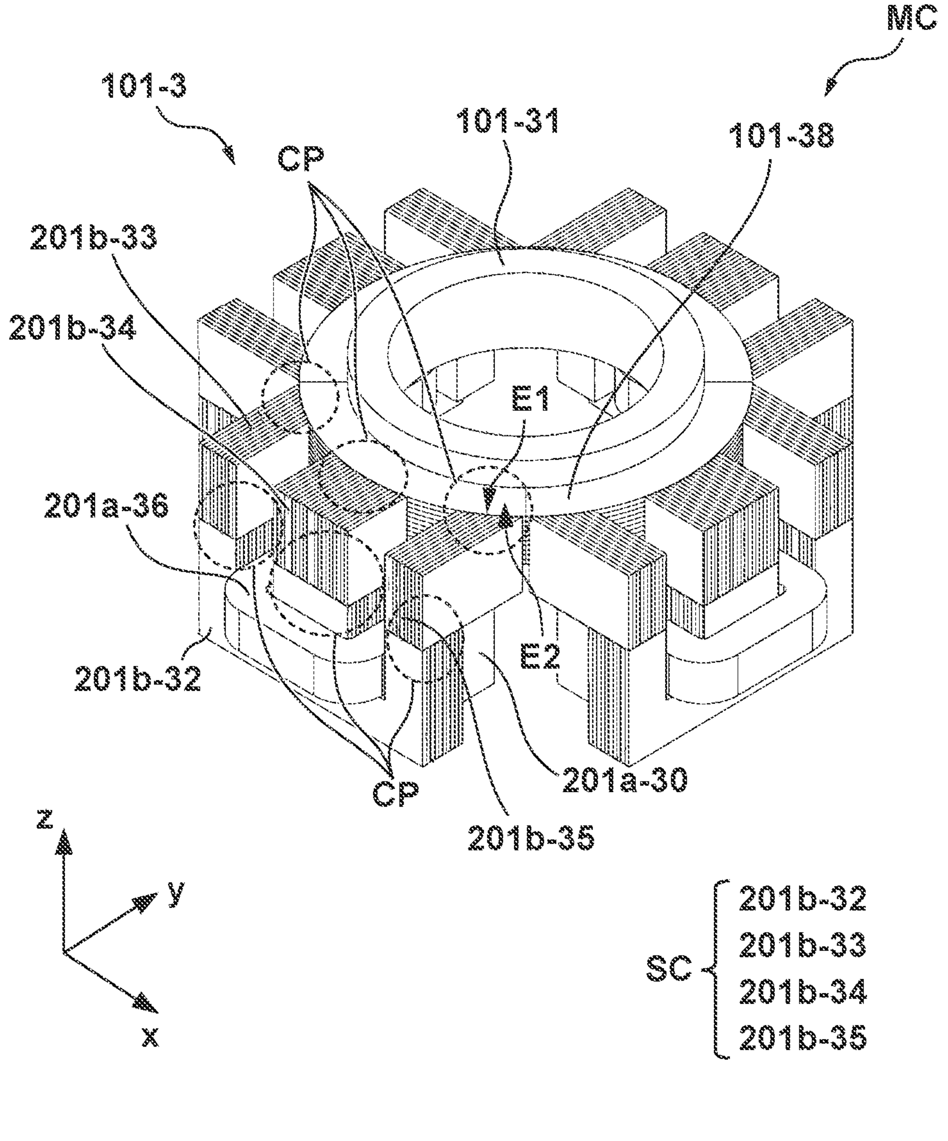
FIG. 12 is a view exemplarily showing the arrangement of a modification of the fine motion electromagnet according to the second embodiment.

FIG. 12 exemplarily shows the arrangement of a modification of the fine motion electromagnet 101-3 according to the second embodiment. Matters which are not referred to as the modification can comply with the arrangement according to the second embodiment shown in FIGS. 10 and 11. The fine motion electromagnet 101-3 can include the fixed iron cores (first members) SC, the support members 201*a*-30 that support the fixed iron cores SC, the movable iron core (second member) MC, the support members 101-31 that support the movable iron core (second member) MC, and coils 201*a*-36. Each fixed iron core (first member) SC can include a first element 201*b*-32, a second element 201*b*-33, a third element 201*b*-34, and a fourth element 201*b*-35. The movable iron core (second member) MC can include an element 101-38 and may include one or a plurality of other elements in addition to the element 101-38. The fixed iron core (first member) SC can include first end faces E1. The movable iron core (second member) MC can include a second end face E2 facing the first end faces E1 through air gaps. In this case, the first end faces E1 are respectively provided on the second element 201*b*-33, the third element 201*b*-34, and the fourth element 201*b*-35. The second end face E2 is provided on the element 101-38. In the modification shown in FIG. 12, the first element 201*b*-32 has an E-shape, and the coil 201*b*-36 is wound around the middle tooth of the first element 201*b*-32. In the modification shown in FIG. 12, the second element 201*b*-33, the third element 201*b*-34, and the fourth element 201*b*-35 each have a rectangular parallelepiped shape.

Figure 18:
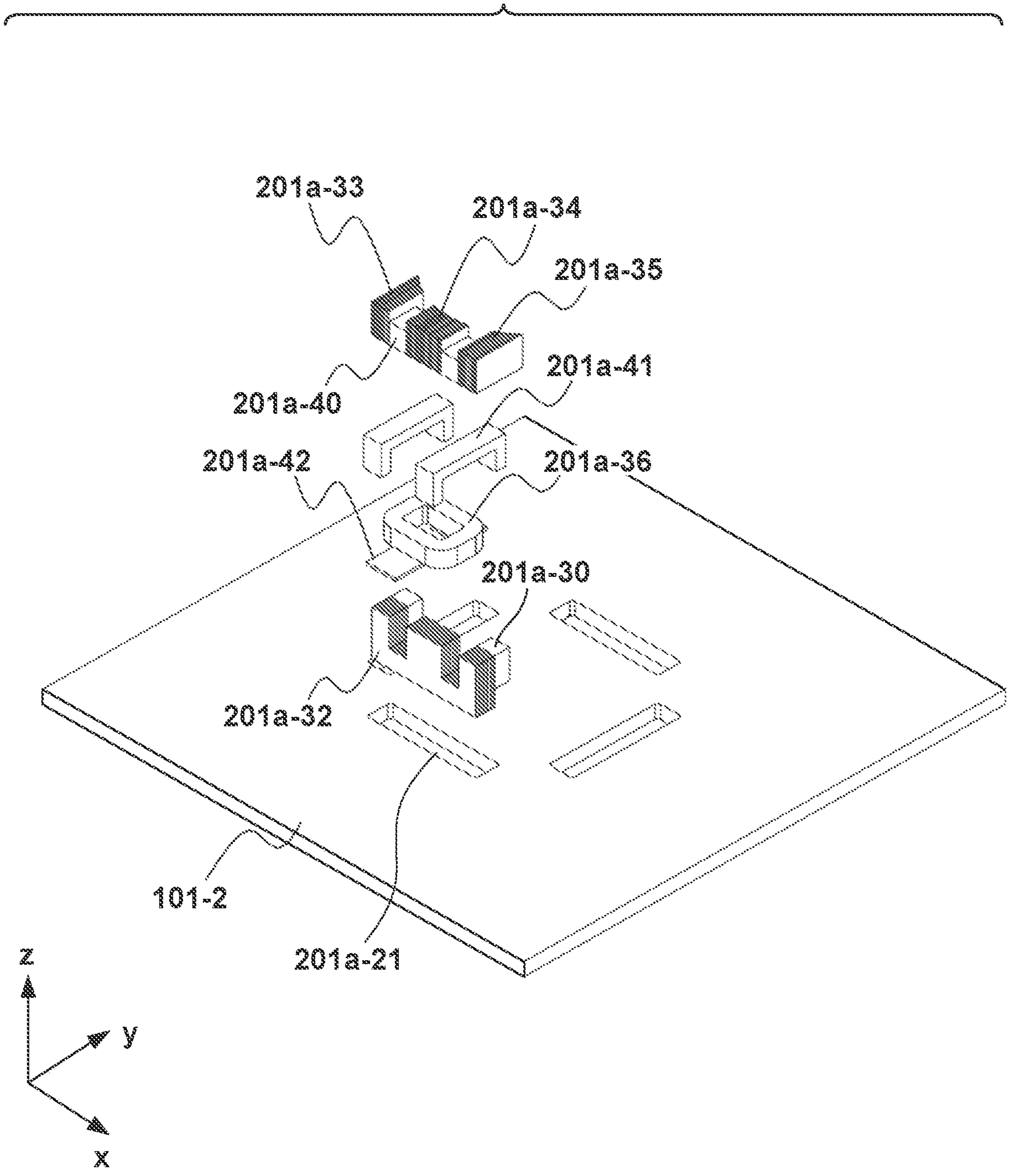
FIG. 18 is a view for explaining an assembly method and a manufacturing method for a modification of the fine motion electromagnet according to the second embodiment.

An assembly method or manufacturing method for the fine motion electromagnet 101-3 according to the modification shown in FIG. 12 will be described below with reference to FIGS. 18 to 22. FIG. 18 shows a state in which the fine motion electromagnet 101-3 according to the modification in FIG. 12 is disassembled. The first element 201*a*-32 and the support member 201*a*-30 can be coupled to each other with an adhesive agent, clamping, fitting, or the like. The coil 201*a*-36 and a coil base 201*a*-42 can be coupled to each other with an adhesive agent or the like. In addition, the second element 201*b*-33, the third element 201*b*-34, and the fourth element 201*b*-35 can be coupled to each other through front end component spacers 201*a*-40 with an adhesive agent, clamping, fitting, or the like.

Figure 19:
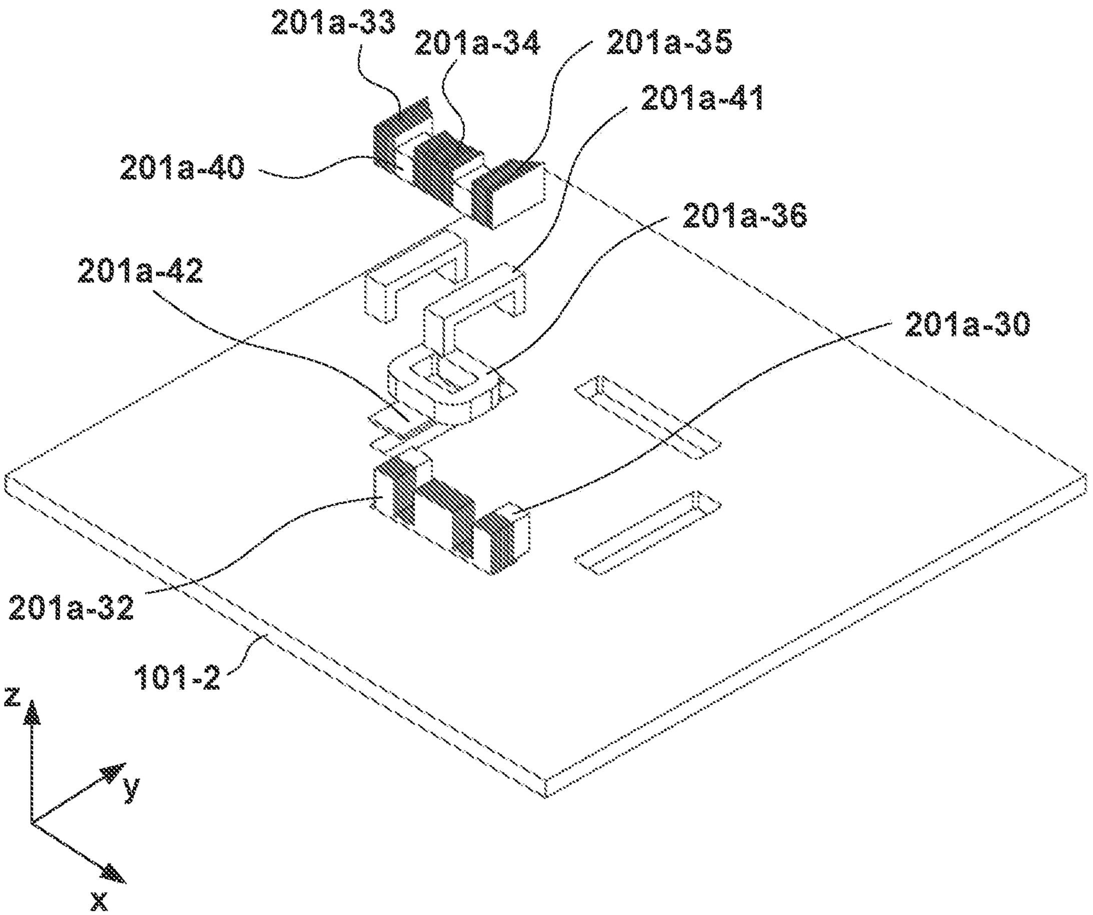
FIG. 19 is a view for explaining the assembly method and the manufacturing method for the modification of the fine motion electromagnet according to the second embodiment.

As exemplarily shown in FIG. 19, the first element 201*a*-32 is inserted in the opening 201*a*-21 of the fine motion base 101-2, and the coupled structure of the first element 201*a*-32 and the support member 201*a*-30 can be positioned to the fine motion base 101-2. The support member 201*a*-30 can be fixed to the fine motion base 101-2. The support member 201*a*-30 can be fixed to the fine motion base 101-2 by, for example, screw fastening, an adhesive agent, clamping, or fitting.

Figure 20:
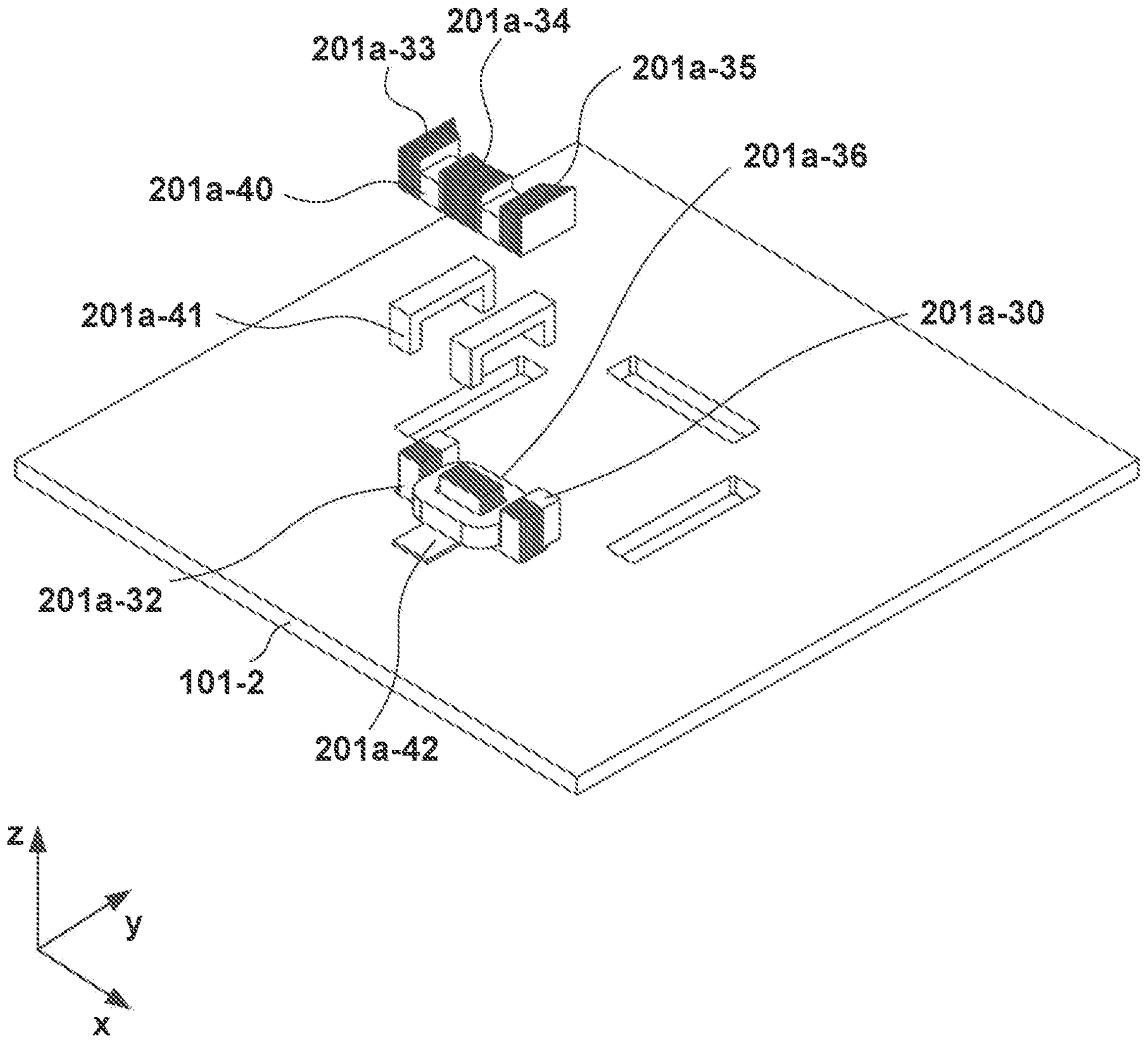
FIG. 20 is a view for explaining the assembly method and the manufacturing method for the modification of the fine motion electromagnet according to the second embodiment.

As exemplarily shown in FIG. 20, the coupled structure of the coil 201*a*-36 and the coil base 201*a*-42 can be positioned to the fine motion base 101-2, and the coil base 201*a*-42 can be fixed to the fine motion base 101-2. The coil base 201*a*-42 can be fixed to the fine motion base 101-2 by, for example, screw fastening, an adhesive agent, clamping, or fitting.

Figure 21:
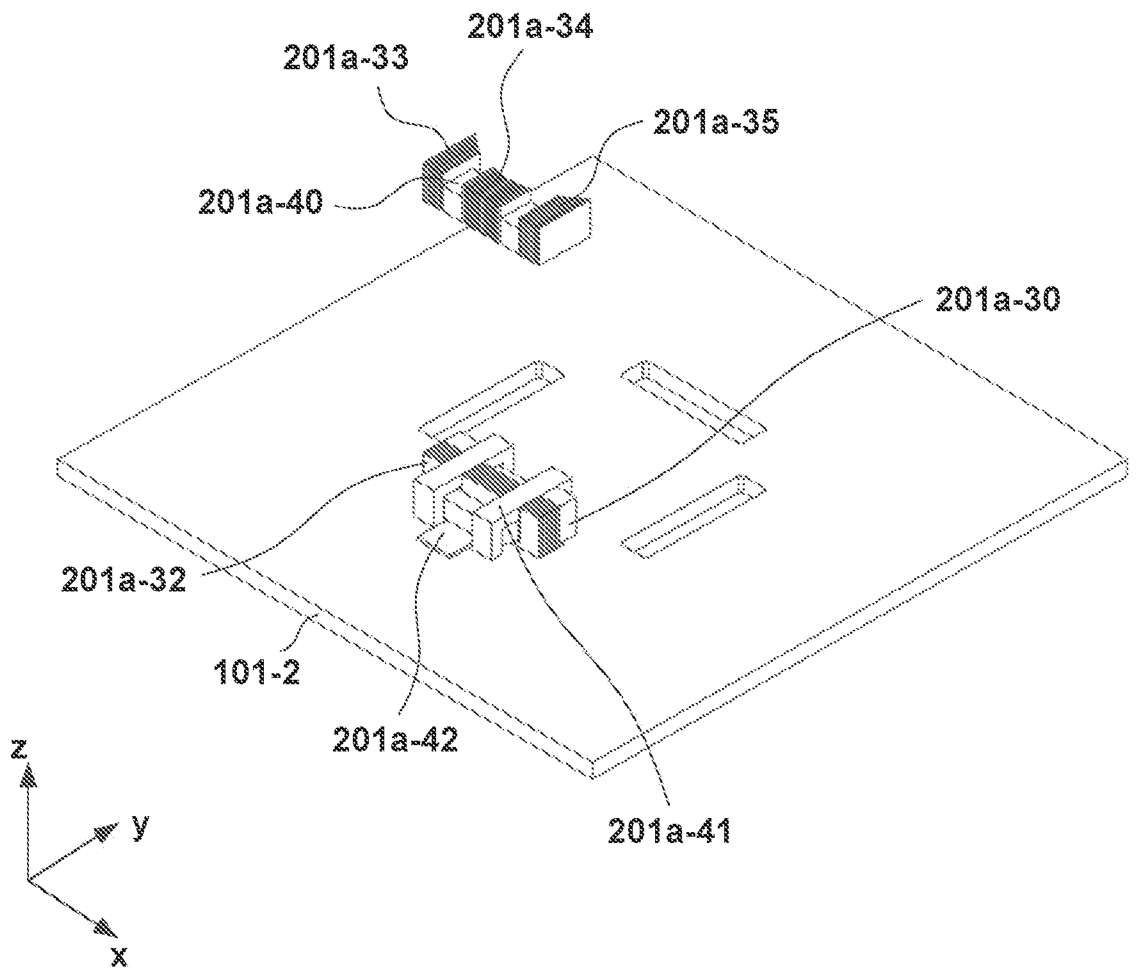
FIG. 21 is a view for explaining the assembly method and the manufacturing method for the modification of the fine motion electromagnet according to the second embodiment.

As exemplarily shown in FIG. 21, front end component bases 201*a*-41 can be fixed to the fine motion base 101-2 by, for example, screw fastening, an adhesive agent, clamping, or fitting.

Figure 22:
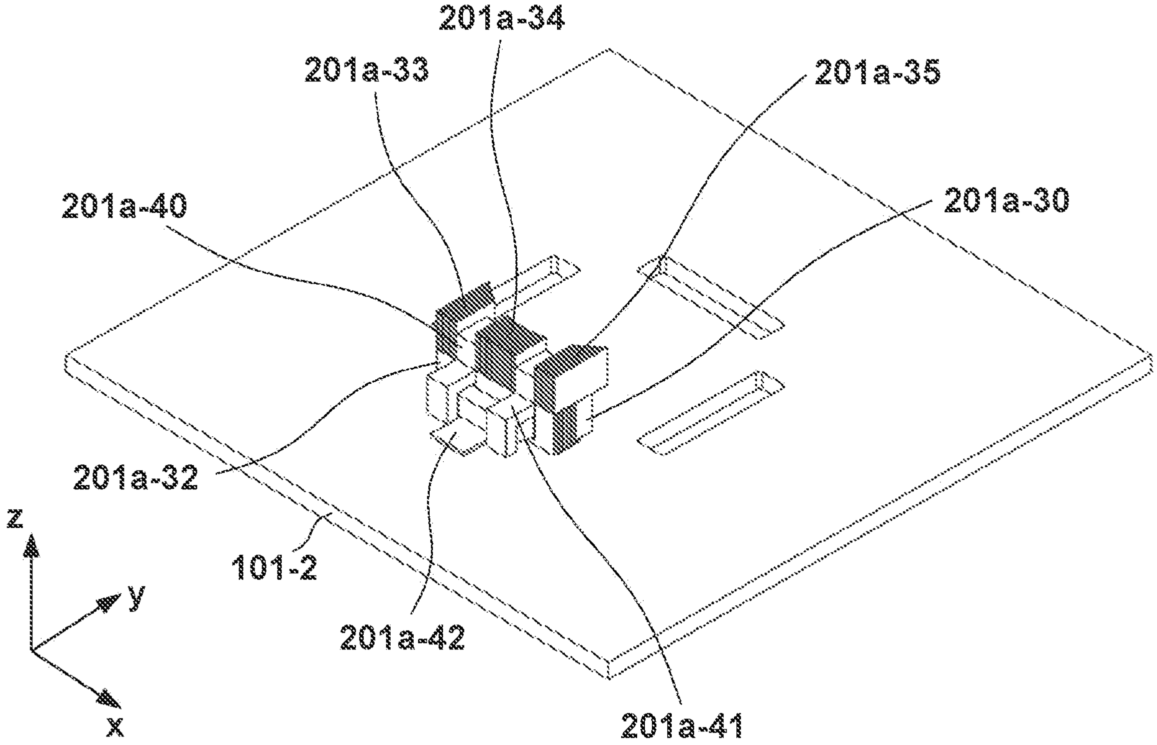
FIG. 22 is a view for explaining the assembly method and the manufacturing method for the modification of the fine motion electromagnet according to the second embodiment.

As exemplarily shown in FIG. 22, the coupled structure of the second element 201*a*-33, the third element 201*a*-34, and the fourth element 201*a*-35 can be fixed to the front end component bases 201*a*-41. This fixing operation can be performed by fixing the front end component spacers 201*a*-40 to the front end component bases 201*a*-41 by screw fastening, an adhesive agent, clamping, fitting, or the like.

The coil 201*a*-36 can be replaced as follows. The state shown in FIG. 19 is restored through a procedure reverse to that described above. As exemplarily shown in FIG. 20, a new coil 201*a*-36 is fixed to the fine motion base 101-2. Thereafter, the procedure exemplarily shown in FIGS. 21 and 22 is executed.

In forming the fixed iron core SC by coupling a plurality of elements, for example, a minute relative shift may occur between two elements (for example, the second element 201*a*-33 and the first element 201*a*-32) along the boundary surface. This may generate particles. In order to take countermeasures against this, the boundary surface may be coated to prevent the generation of particles, a recovery pan may be provided near the boundary surface, or a collecting magnet may be provided near the boundary surface. In addition, when the front end component spacer 201*a*-40 is fixed to the front end component base 201*a*-41, a thin spacer may be inserted between them to maintain a non-contact state between the first element 201*a*-32, the second element 201*a*-33, the third element 201*a*-34, and the fourth element 201*a*-35.

Figure 13:
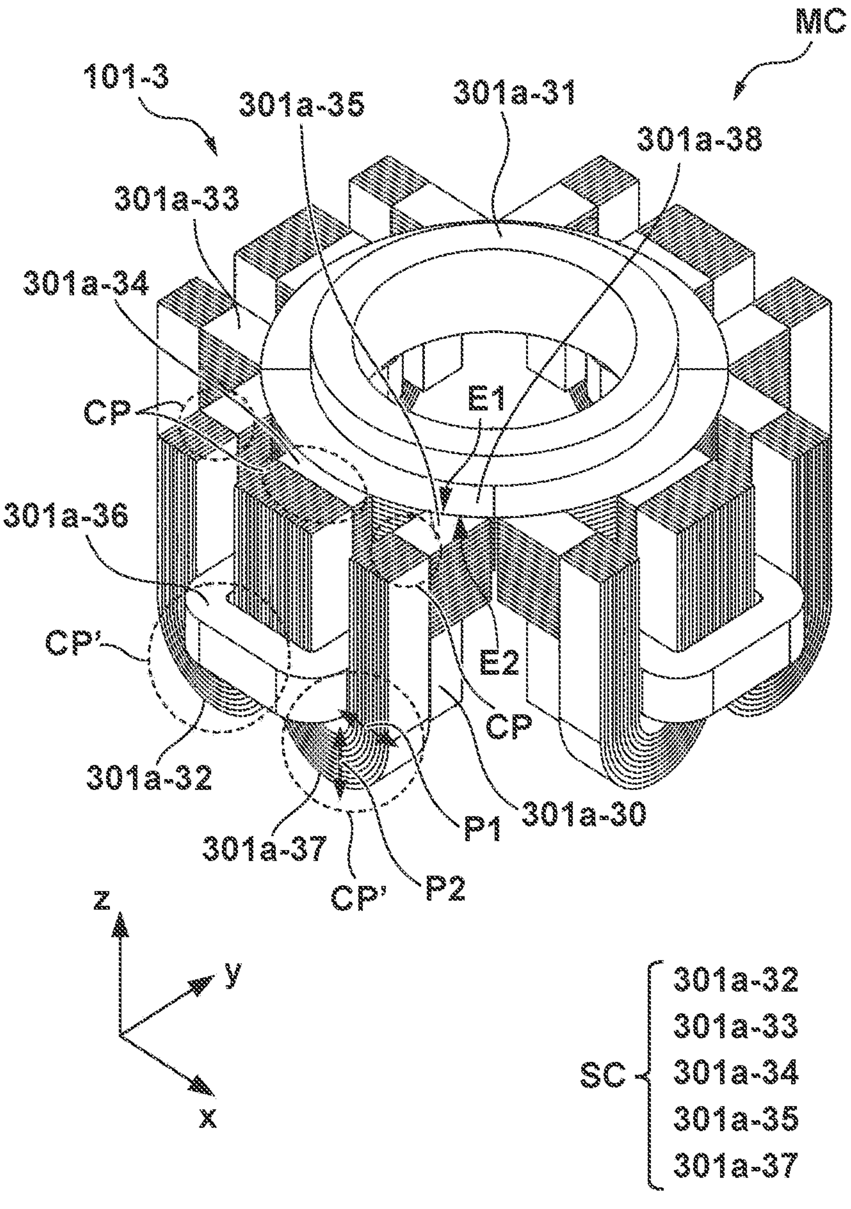
FIG. 13 is a view exemplarily showing the arrangement of a fine motion electromagnet according to the third embodiment.

An exposure device and a fine motion electromagnet 101-3 according to the third embodiment will be described below. Matters which are not referred to as the third embodiment can comply with the first or second embodiment. FIG. 13 exemplarily shows the arrangement of the fine motion electromagnet 101-3 according to the third embodiment. The fine motion electromagnet 101-3 can include fixed iron cores (first members) SC, support members 301*a*-30 that support the fixed iron cores SC, a movable iron core (second member) MC, support members 301*a*-31 that support the movable iron core MC, and coils 301*a*-36. Each fixed iron core (first member) SC can include a first element 301*a*-32, a second element 301*a*-37, a third element 301*a*-33, a fourth element 301*a*-34, and a fifth element 301*a*-35. The movable iron core (second member) MC can include an element 301*a*-38 and may include one or a plurality of other elements in addition to the element 301*a*-38. The fixed iron core (first member) SC can include first end faces E1. The movable iron core (second member) MC can include a second end face E2 facing the first end faces E1 through air gaps. In this case, the first end faces E1 are respectively provided on the third element 301*a*-33, the fourth element 301*a*-34, and the fifth element 301*a*-35. The second end face E2 is provided on the element 301*a*-38.

The fixed iron core (first member) SC can be formed from a laminated body of a plurality of electromagnetic steel plates. Each of the plurality of electromagnetic steel plates can be covered by an insulating film. In another point of view, the third element 301*a*-33, the fourth element 301*a*-34, and the fifth element 301*a*-35 constituting part of the fixed iron core (first member) SC each can be formed from a stacked iron core obtained by laminating a plurality of electromagnetic steel plates. In addition, the first element 301*a*-32 and the second element 301*a*-37 constituting another part of the fixed iron core (first member) SC each can be formed from a wound iron core that can be formed by winding an electromagnetic steel plate. In a state in which a wound iron core is used as a component of the fixed iron core (first member) SC, the wound iron core has one form of the structure obtained by laminating a plurality of electromagnetic steel plates. The movable iron core (second member) MC can be formed from a stacked iron core obtained by laminating a plurality of electromagnetic steel plates. In another point of view, the element 301*a*-38 as at least one element constituting the movable iron core (second member) MC can be formed from a laminated body of a plurality of electromagnetic steel plates. Each of the plurality of electromagnetic steel plates can be covered by an insulating film.

The magnetic circuit constituted by the fixed iron core (first member) SC, the movable iron core (second member) MC, and the air gaps (spaces between the first end faces E1 and the second end face E2) can include changing parts CP and CP' at which the lamination direction of the laminated body of the plurality of electromagnetic steel plates changes at a right angle. The changing part CP can include a contact portion between a first portion (for example, the fifth element 301*a*-38) at which the lamination direction is a first direction (for example, the Z-axis direction) and a second portion (for example, the third element 301*a*-37) at which the lamination direction is a second direction (for example, the X-axis direction) orthogonal to the first direction. The changing part CP can include a portion at which the first portion (for example, the fifth element 301*a*-38) at which the lamination direction is the first direction faces the second portion (for example, the second element 301*a*-37) at which the lamination direction is the second direction orthogonal to the first direction through a solid member. The solid member can be an insulating film that covers each of the plurality of electromagnetic steel plates. The changing part CP' includes a portion at which the lamination direction gradually changes from the first direction (for example, the X-axis direction) to the second direction (for example, the Z-axis direction) orthogonal to the first direction. The changing part CP' including the portion at which the lamination direction gradually changes can be part of a wound iron core. The fixed iron core (first member) SC includes a first portion P1 at which the lamination direction is the first direction (for example, the X-axis direction) and a second portion P2 at which the lamination direction is the second direction (for example, the Z-axis direction). The lamination direction gradually changes between the first portion P1 and the second portion P2. The changing part CP' is a portion between the first portion P1 and the second portion P2.

In the case shown in FIG. 13, the changing parts CP and CP' are provided on the fixed iron core (first member) SC. At least one of the changing parts CP and CP' may be additionally provided on the movable iron core (second member) MC or provided on only the movable iron core (second member) MC. One of the fixed iron core (first member) SC and the movable iron core (second member) MC may be formed from at least one stacked iron core, and the other of the fixed iron core (first member) SC and the movable iron core (second member) MC may be formed from a wound iron core. The changing part may be formed from a wound iron core.

The first element 301*a*-32, the second element 301*a*-37, the third element 301*a*-33, the fourth element 301*a*-34, and the fifth element 301*a*-35 may be integrated by using an adhesive material or by being fastened to each other using a clamp component. In this case, the changing parts CP and CP' are provided on the fixed iron core (first member) SC, and a coil 301*a*-36 is wound around the fixed iron core (first member) SC. The coil 301*a*-36 can be wound around a portion different from the portion of the fixed iron core (first member) SC at which the changing parts CP and CP' are placed. Making a current flow in the coil 301*a*-36 will generate an attraction force between the first end faces E1 and the second end face E2. In the case shown in FIG. 13, the first element 301*a*-32 and the second element 301*a*-37 each have a U-shape, and the coil 301*a*-36 is wound around the portion obtained by integrating one tooth of the first element 301*a*-32 and one tooth of the second element 301*a*-37.

The changing parts CP and CP' are provided to prevent magnetic fluxes passing through the magnetic circuit constituted by the fixed iron core (first member) SC, the movable iron core (second member) MC, and the air gaps from flowing in the plurality of electromagnetic steel plates constituting the fixed iron core (first member) SC and the movable iron core (second member) MC in the lamination directions of them. Alternatively, the changing parts CP and CP', the fixed iron core (first member) SC, and the movable iron core (second member) MC can be provided to cause magnetic fluxes passing through the fixed iron core SC and the movable iron core MC to flow along the plane directions of the respective electromagnetic steel plates. Alternatively, the changing parts CP and CP' can be provided to reduce the magnetic resistance of the magnetic circuit constituted by the fixed iron core (first member) SC, the movable iron core (second member) MC, and the air gaps as compared with the case in which the changing parts CP and CP' are not present. Alternatively, the changing parts CP and CP' can be provided to reduce the eddy currents generated in the magnetic circuit constituted by the fixed iron core (first member) SC, the movable iron core (second member) MC, and the air gaps as compared with the case in which the changing parts CP and CP' are not present.

In the case shown in FIG. 13, the lamination direction (Z-axis direction) of the third element 301*a*-33, the fourth element 301*a*-34, and the fifth element 301*a*-35 each having the first end faces E1 is equal to the lamination direction (Z-axis direction) of the element 301*a*-38 having the second end face E2. This can contribute to a reduction in magnetic resistance near the air gaps and an increase in magnetic flux.

The lamination direction of the third element 301*a*-33, the fourth element 301*a*-34, and the fifth element 301*a*-35 may be the X-axis direction instead of the lamination direction in the arrangement example shown in FIG. 13. Such an arrangement can contribute to a reduction in magnetic resistance near the boundary portions between the third element 301*a*-33 and the fourth element 301*a*-34 and the fifth element 301*a*-35, the first element 301*a*-32, and the second element 301*a*-37 and an increase in magnetic flux.

Figure 14:
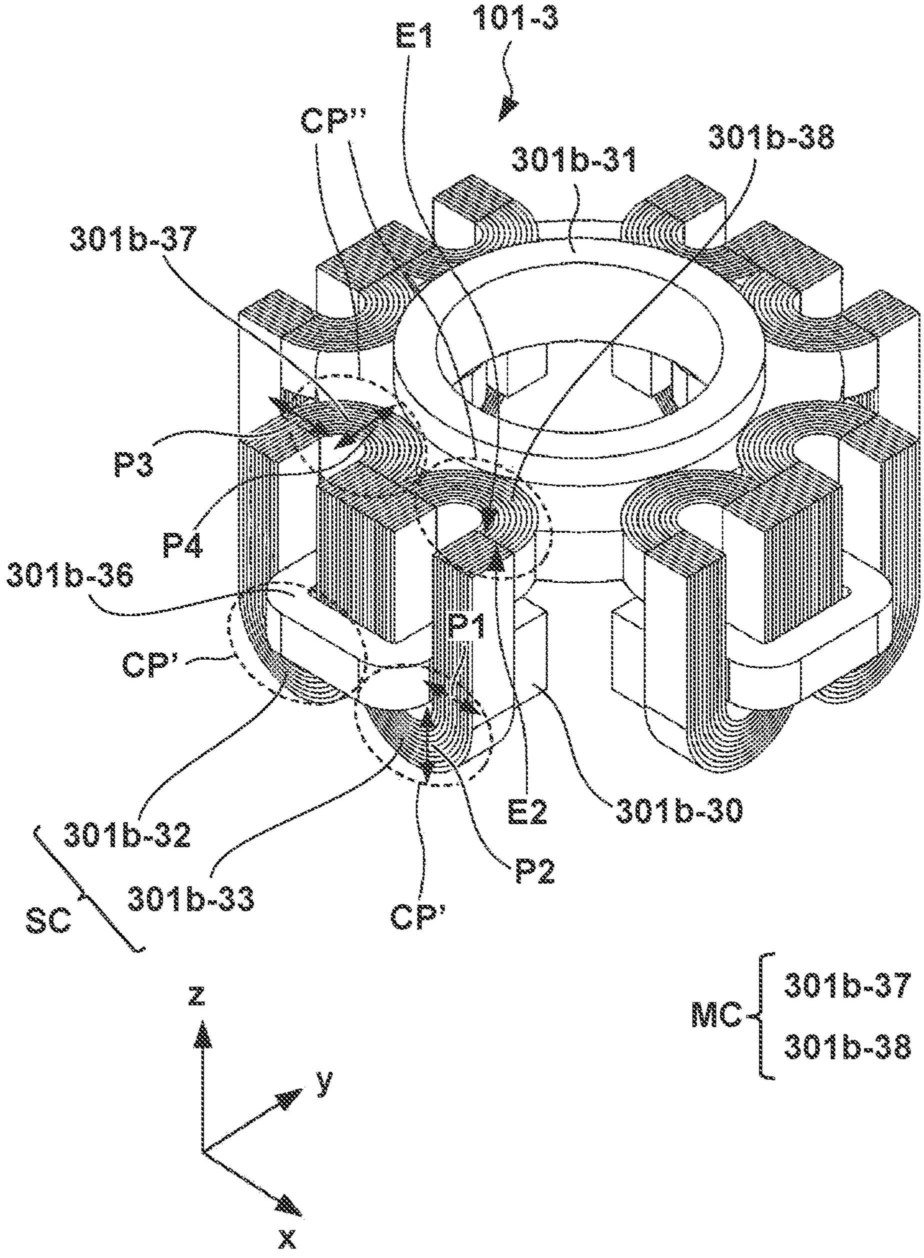
FIG. 14 is a view exemplarily showing the arrangement of a modification of the fine motion electromagnet according to the third embodiment.

FIG. 14 exemplarily shows the arrangement of a modification of the fine motion electromagnet 101-3 according to the third embodiment. Matters which are not referred to as the modification can comply with the arrangement according to the third embodiment shown in FIG. 13. The fine motion electromagnet 101-3 can include the fixed iron cores (first members) SC, support members 301*b*-30 that support the fixed iron cores (first members) SC, the movable iron core (second member) MC, support members 301*b*-31 that support the movable iron core MC, and coils 301*b*-36. Each fixed iron core (first member) SC can include a first element 301*b*-32 and a second element 301*b*-33. The movable iron core (second member) MC can include a third element 301*b*-37 and a fourth element 301*b*-38. The fixed iron core (first member) SC includes first end faces E1. The movable iron core (second member) MC includes second end faces E2 facing the first end faces E1 through air gaps. In this case, the first end faces E1 are respectively provided on the first element 301*b*-32 and the second element 301*b*-33. The second end faces E2 are respectively provided on the third element 301*b*-37 and the fourth element 301*b*-38.

The fixed iron core (first member) SC can be formed from a laminated body of a plurality of electromagnetic steel plates. Each of the plurality of electromagnetic steel plates can be covered by an insulating film. In another point of view, the first element 301*b*-32 and the second element 301*b*-33 constituting part of the fixed iron core (first member) SC can be formed from a laminated body of a plurality of electromagnetic steel plates. In a state in which a wound iron core is used as a component of the fixed iron core (first member) SC, the wound iron core has a form of a laminated structure of a plurality of electromagnetic steel plates. The movable iron core (second member) MC can be formed from a laminated body of a plurality of electromagnetic steel plates. In another point of view, the third element 301*b*-37 and the fourth element 301*b*-38 constituting the movable iron core (second member) MC can be formed from a laminated body of a plurality of electromagnetic steel plates. Each of the plurality of electromagnetic steel plates can be covered by an insulating film.

The magnetic circuit constituted by the fixed iron core (first member) SC, the movable iron core (second member) MC, and the air gaps (spaces between the first end faces E1 and the second end face E2) can include changing parts CP' and CP" at which the lamination direction of the laminated body of the plurality of electromagnetic steel plates changes at a right angle. In this case, the changing part CP' is provided on the fixed iron core (first member) SC. The changing part CP" is provided on the movable iron core (second member) MC.

The changing part CP' includes a portion at which the lamination direction gradually changes from the first direction (for example, the X-axis direction) to the second direction (for example, the Z-axis direction) orthogonal to the first direction. The changing part CP' including the portion at which the lamination direction gradually changes can be part of a wound iron core. The fixed iron core (first member) SC includes a first portion P1 at which the lamination direction is the first direction (for example, the X-axis direction) and a second portion P2 at which the lamination direction is the second direction (for example, the Z-axis direction). The lamination direction gradually changes between the first portion P1 and the second portion P2. The changing part CP' is a portion between the first portion P1 and the second portion P2.

The movable iron core (second member) MC includes a third portion P3 at which the lamination direction is the first direction (for example, the X-axis direction) and a fourth portion P4 at which the lamination direction is the second direction (for example, the Y-axis direction). The lamination direction gradually changes between the third portion P3 and the fourth portion P4. The changing part CP" is a portion between the third portion P3 and the fourth portion P4.

Making a current flow in the coil 301*b*-36 will generate an attraction force between the first end faces E1 and the second end face E2. In the case shown in FIG. 14, the first element 301*b*-32 and the second element 301*b*-33 each have a U-shape, and the coil 301*b*-36 is wound around the portion obtained by integrating one tooth of the first element 301*a*-32 and one tooth of the second element 301*a*-37.

The changing parts CP' and CP" are provided to prevent magnetic fluxes passing through the magnetic circuit constituted by the fixed iron core (first member) SC, the movable iron core (second member) MC, and the air gaps from flowing in the plurality of electromagnetic steel plates constituting the fixed iron core SC and the movable iron core MC in the lamination directions of them. Alternatively, the changing parts CP' and CP", the fixed iron core (first member) SC, and the movable iron core (second member) MC can be provided to cause magnetic fluxes passing through the fixed iron core SC and the movable iron core MC to flow along the plane directions of the respective electromagnetic steel plates. Alternatively, the changing parts CP' and CP" can be provided to reduce the magnetic resistance of the magnetic circuit constituted by the fixed iron core (first member) SC, the movable iron core (second member) MC, and the air gaps as compared with the case in which the changing parts CP' and CP" are not present. Alternatively, the changing parts CP' and CP" can be provided to reduce the eddy currents generated in the magnetic circuit constituted by the fixed iron core (first member) SC, the movable iron core (second member) MC, and the air gaps as compared with the case in which the changing parts CP' and CP" are not present.

In the case shown in FIG. 14, the lamination direction (X-axis direction) of the first element 301*b*-32 and the second element 301*b*-33 at the first end faces E1 is equal to the lamination direction (X-axis direction) of the third element 301*b*-37 and the fourth element 301*b*-38 at the second end faces E2. This can contribute to a reduction in magnetic resistance near the air gaps and an increase in magnetic flux. In addition, in the case shown in FIG. 14, in the magnetic circuit constituted by the fixed iron core (first member) SC, the movable iron core (second member) MC, and the air gaps, the lamination direction does not steeply change. This is advantageous in reducing the magnetic resistance and increasing the magnetic flux.

Figure 15:
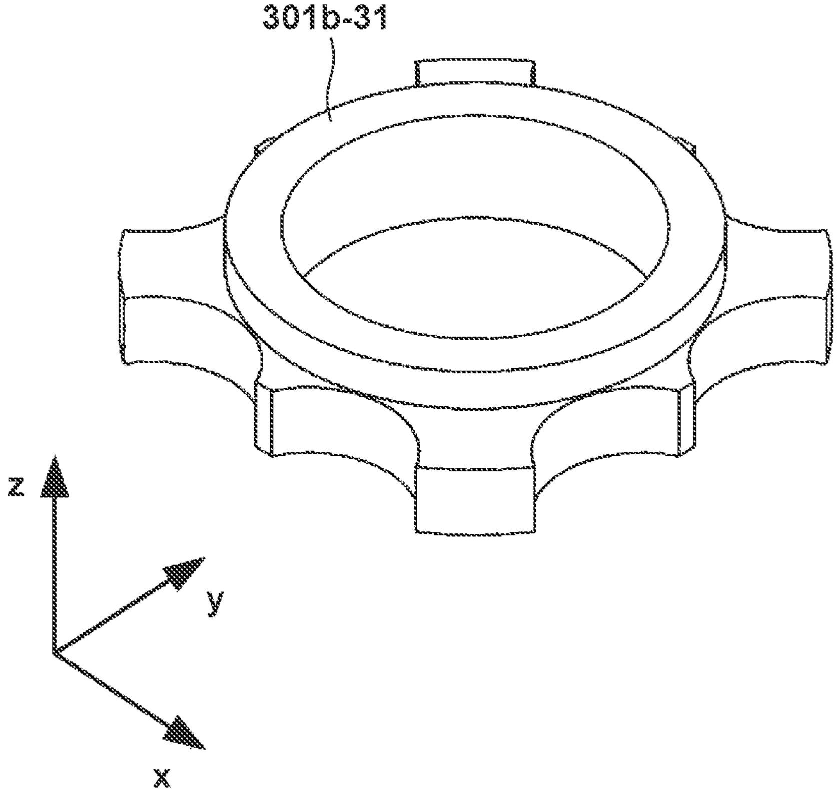
FIG. 15 is a view exemplarily showing the arrangement of the support member of a movable iron core in a modification of the fine motion electromagnet according to the third embodiment.

FIG. 15 exemplarily shows the structure of the support member 301*b*-31 that supports the movable iron core MC. The support member 301*b*-31 can have a star wheel shape to support the movable iron core MC that can be constituted by a wound iron core.

Figure 23A:
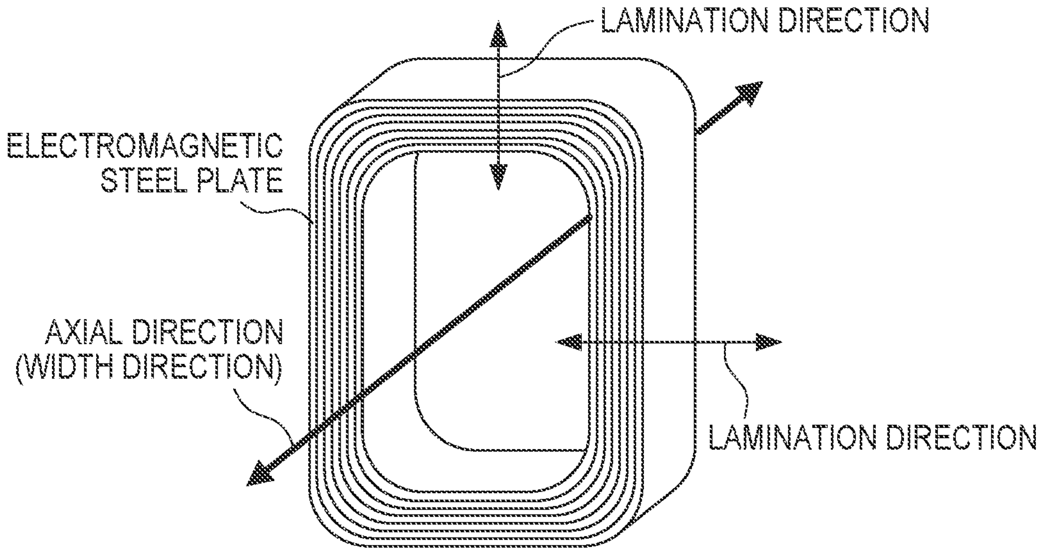
FIGS. 23A and 23B are views for exemplarily explaining a wound iron core.
Figure 23B:
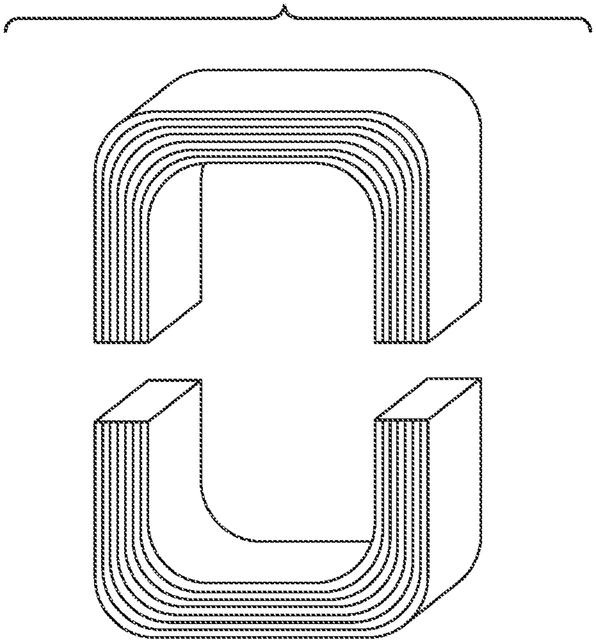
Figure 24:
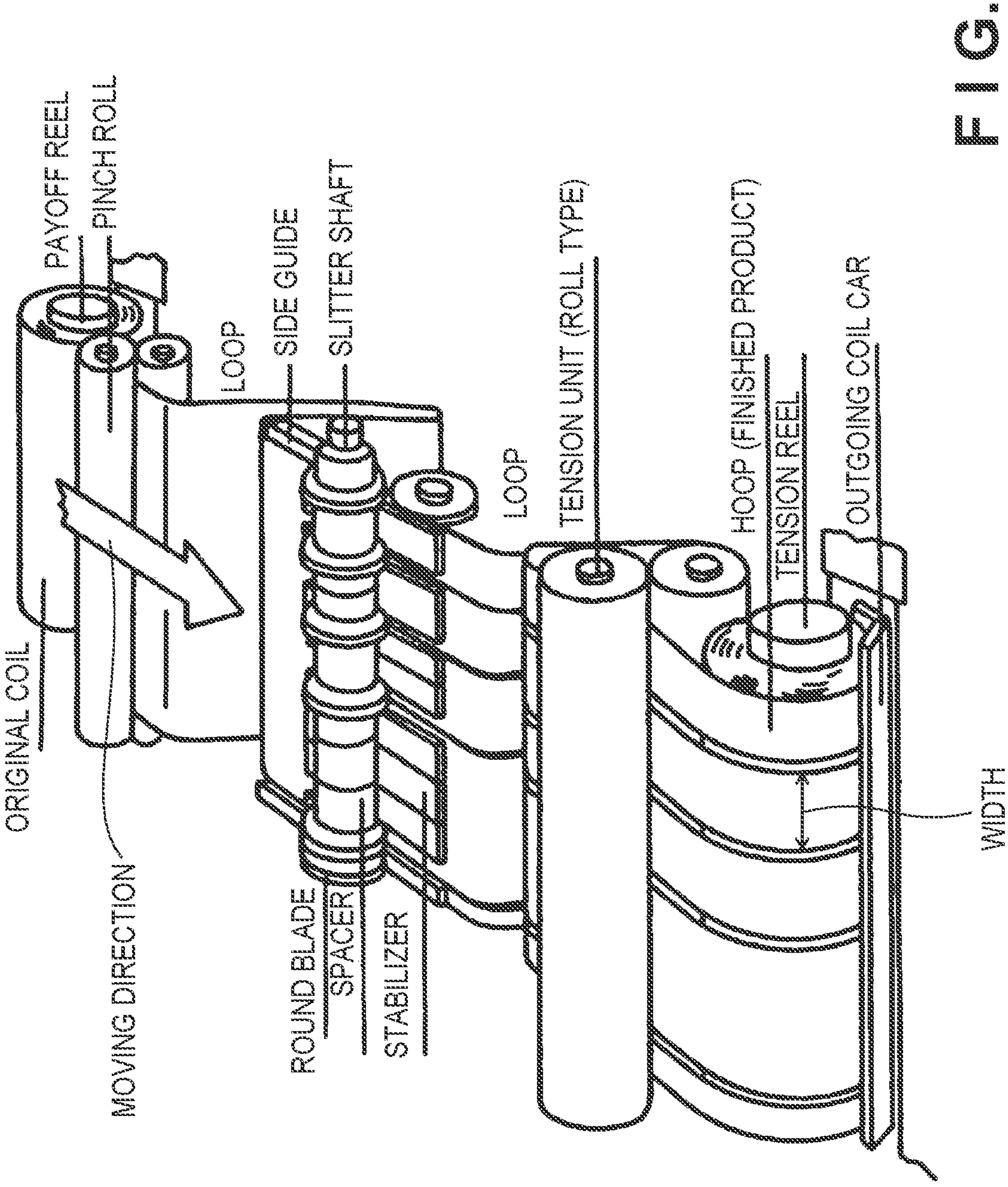
FIG. 24 is a view for exemplarily explaining a manufacturing method for a wound iron core.

A wound iron core will be described below with reference to FIGS. 23A and 23B. FIG. 23A exemplarily shows a wound iron core. FIG. 23B shows the wound iron core obtained by cutting the wound iron core exemplarily shown in FIG. 23A by wire cutting or the like. Such a wound iron core is also called a cut core. A wound iron core can be manufactured by winding a hoop material around a core (not shown). As exemplarily shown in FIG. 24, a hoop material can be manufactured with a slitter exemplarily shown in FIG. 24. A hoop material can be obtained by feeding a raw material coil roll in the threading direction and cutting the roll with a desired width using a slitter including rotary knives provided midway in the threading direction. This width is determined by the interval between the rotary knives of the slitter.

As exemplarily shown in FIG. 23A, the wound iron core is a laminated body of a plurality of electromagnetic steel plates. One wound iron core has a plurality of lamination directions. In other words, a wound iron core can be used as a member constituting the above changing part. A lamination direction is a direction passing through the electromagnetic steel plates at a portion of interest of the wound iron core. The widthwise direction is a direction determined by the slitter and is also an axial direction. The axial direction is a direction parallel to any portion on the widest surface of each electromagnetic steel plate.

In one aspect, an electromagnetic device according to the present invention can include a plurality of iron core members formed from stacked iron cores or wound iron cores and a coil that causes the iron core members to generate magnetic fluxes. In this case, the lamination direction of a given stacked iron core can be orthogonal to the widthwise direction of a given wound iron core, the lamination direction of a given stacked iron core can be orthogonal to the lamination direction of another stacked iron core, or the widthwise direction of a given wound iron core can be orthogonal to the widthwise direction of another wound iron core.

Figure 16:
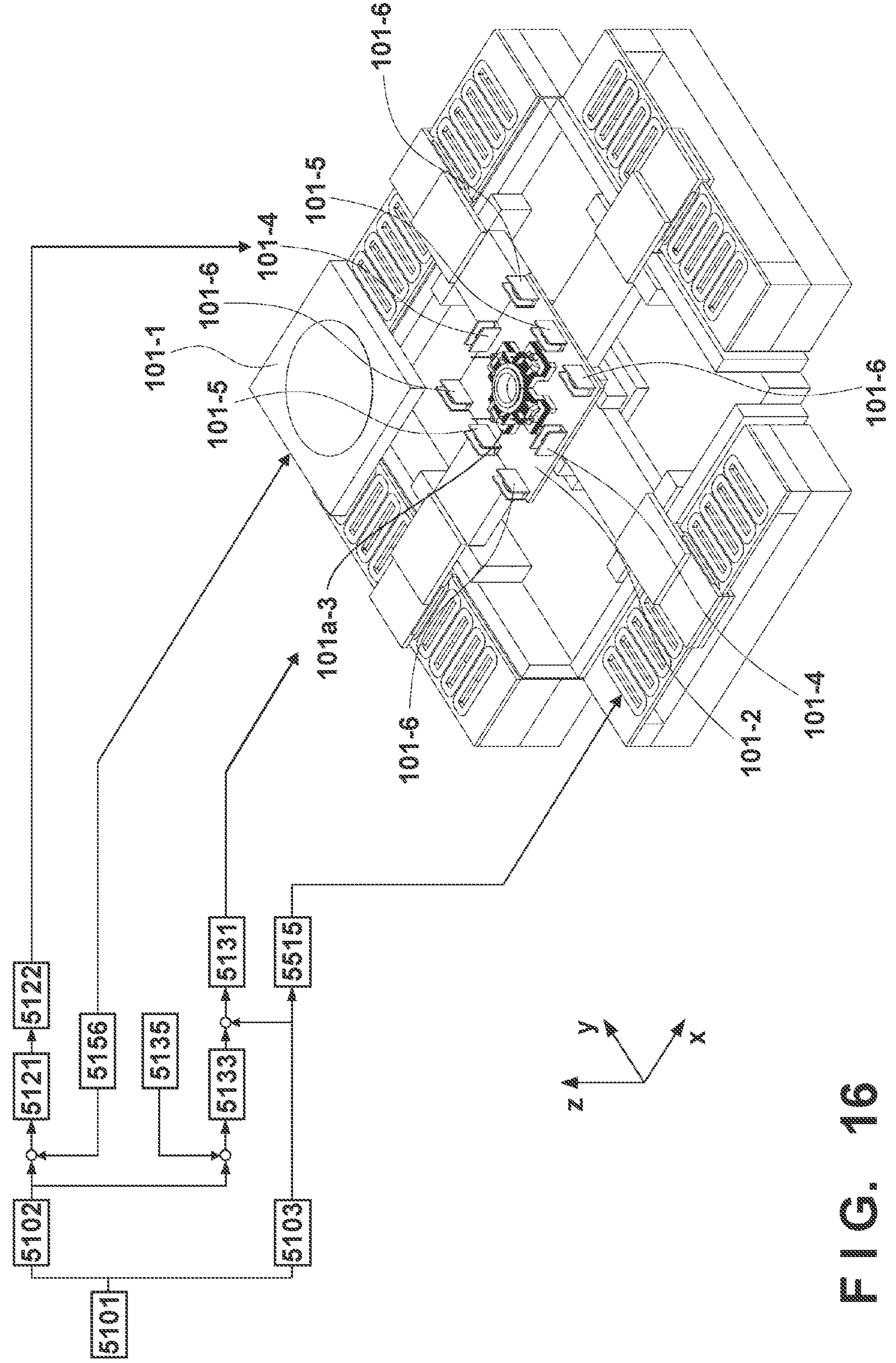
FIG. 16 is a view exemplarily showing the arrangement of the control system of a wafer stage device according to an embodiment.

A control system of a wafer stage device 500 will be described below. FIG. 16 exemplarily shows the arrangement of the control system of the wafer stage device 500. A moving target providing unit 5101 provides a moving target.

Figure 17:
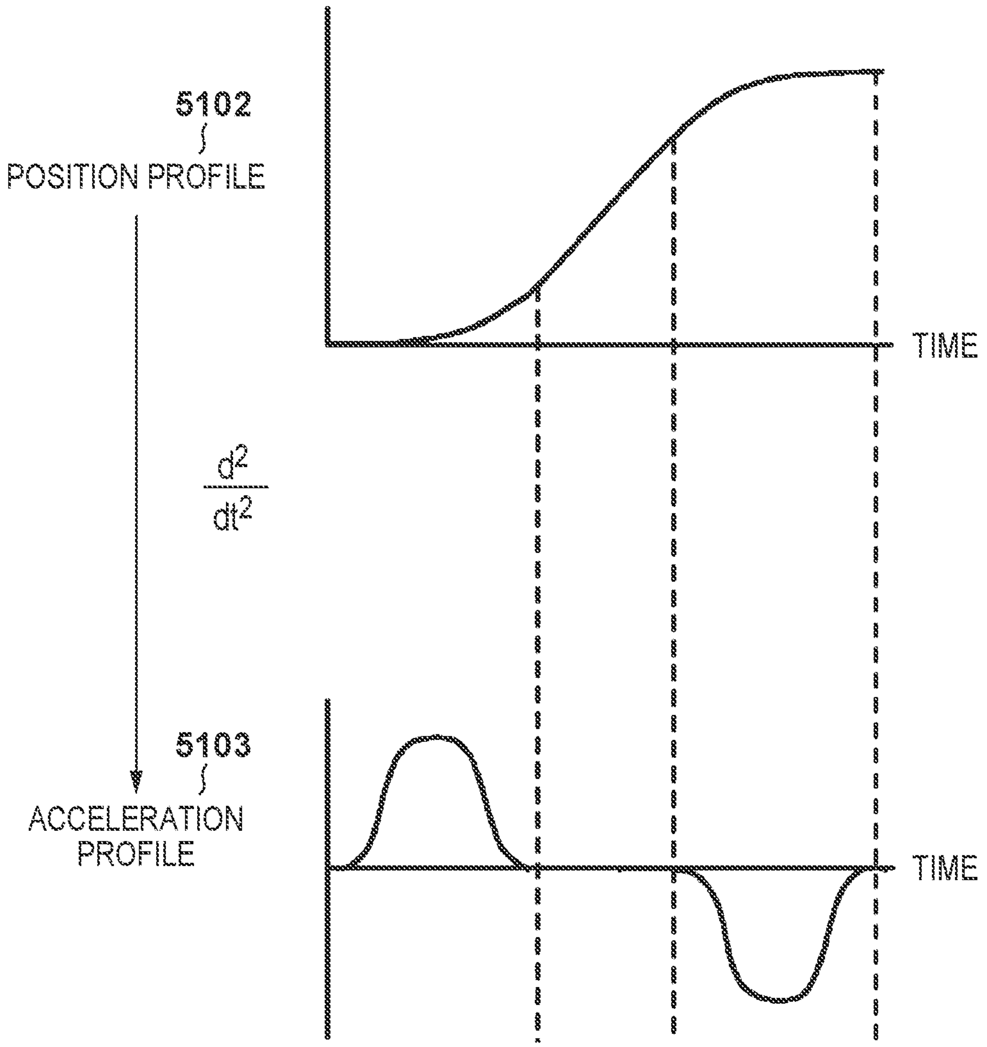
FIG. 17 is a view exemplarily showing a position profile and an acceleration profile.

A position profile generator 5102 generates a position profile indicating the relationship between the time and the position of the fine motion stage 101-1 at the time based on the moving target provided from the moving target providing unit 5101. The position profile generator 5102 generates a target position according to the generated position profile. An acceleration profile generator 5103 generates an acceleration profile indicating the relationship between the time and the acceleration of a fine motion stage 101-1 at the time based on the moving target provided from the moving target providing unit 5101. The acceleration profile generator 5103 generates a target acceleration according to the generated acceleration profile. FIG. 17 exemplarily shows the position profile generated by the position profile generator 5102 and the acceleration profile generated by the acceleration profile generator 5103.

A fine motion position sensor 5156 measures the position of the fine motion stage 101-1. A fine motion position control system 5121 generates a manipulated variable by PID operation in accordance with the deviation between the target position given according to the position profile generated by the position profile generator 5102 and the current position given by the fine motion position sensor 5156. A current amplifier 5122 supplies a current corresponding to the manipulated variable generated by the fine motion position control system 5121 to a fine motion XLM 101-4 and a fine motion YLM 101-5. This feedback-controls the fine motion stage 101-1.

A coarse motion position sensor 5135 measures the position of a fine motion base 101-2. A coarse motion position control system 5133 generates a manipulated variable by PID operation in accordance with the deviation between the target position given according to the position profile generated by the position profile generator 5102 and the current position given by the coarse motion position sensor 5135. A current amplifier 5131 supplies a current corresponding to the manipulated variable generated by the coarse motion position control system 5133 and the target acceleration given from the acceleration profile generator 5103 to a coarse motion linear motor 106. This feedback-controls and feedforwards the fine motion base 101-2.

The target acceleration generated by the acceleration profile generator 5103 is also supplied to an electromagnetic current control system 5515. The electromagnetic current control system 5515 controls the fine motion electromagnet 101-3 in accordance with the target acceleration. When accelerating the fine motion stage 101-1 (fine motion stage device 101), the fine motion electromagnet 101-3 mainly applies a force to the fine motion stage 101-1. The fine motion XLM 101-4 and the fine motion YLM 101-5 can be controlled to generate a thrust force for reducing the slight positional deviation between the target position and the measured current position. This can reduce the heat generated by the fine motion XLM 101-4 and the fine motion YLM 101-5.

The coarse motion position control system 5133 moves the position of the fine motion base 101-2 in accordance with the position profile generated by the position profile generator 5102. The fine motion electromagnet 101-3 is advantageous in generating a large attraction force with a very small amount of heat generated. However, it is necessary to maintain an air gap between the first end faces E1 and the second end face E2 of the fine motion electromagnet 101-3. That is, in order to make the fine motion electromagnet 101-3 keep applying a desired force to the fine motion stage 101-1, it is necessary to maintain the air gap by moving the stator (the fixed iron core and the coil) of the fine motion electromagnet 101-3 in accordance with the movement of the fine motion stage 101-1. In addition, the heat generated by the fine motion ZLM can be reduced by reducing the height of the fine motion electromagnet 101-3 on the fine motion base 101-2. As described above, it is possible to implement accurate position control of the fine motion stage 101-1, a reduction in heat generation, and a reduction in overlay error.

The coarse motion position control system 5133 can implement this. The coarse motion position sensor 5135 typified by an encoder measures a coarse motion position, that is, the position of the fine motion base 101-2. The coarse motion position control system 5133 then drives the coarse motion linear motor 106 based on the deviation between the measured position and the target position. As a result, the positions of the fine motion stage 101-1 (the movable element of the fine motion electromagnet 101-3) and the fine motion base 101-2 (the stator of the fine motion electromagnet 101-3) are also controlled based on an output from the position profile generator 5102, thereby maintaining the air gap. The fine motion position sensor 5156 that measures the position of the fine motion stage 101-1 may be replaced with a sensor that measures the relative position between the fine motion stage 101-1 and the fine motion base 101-2.

Figure 25:
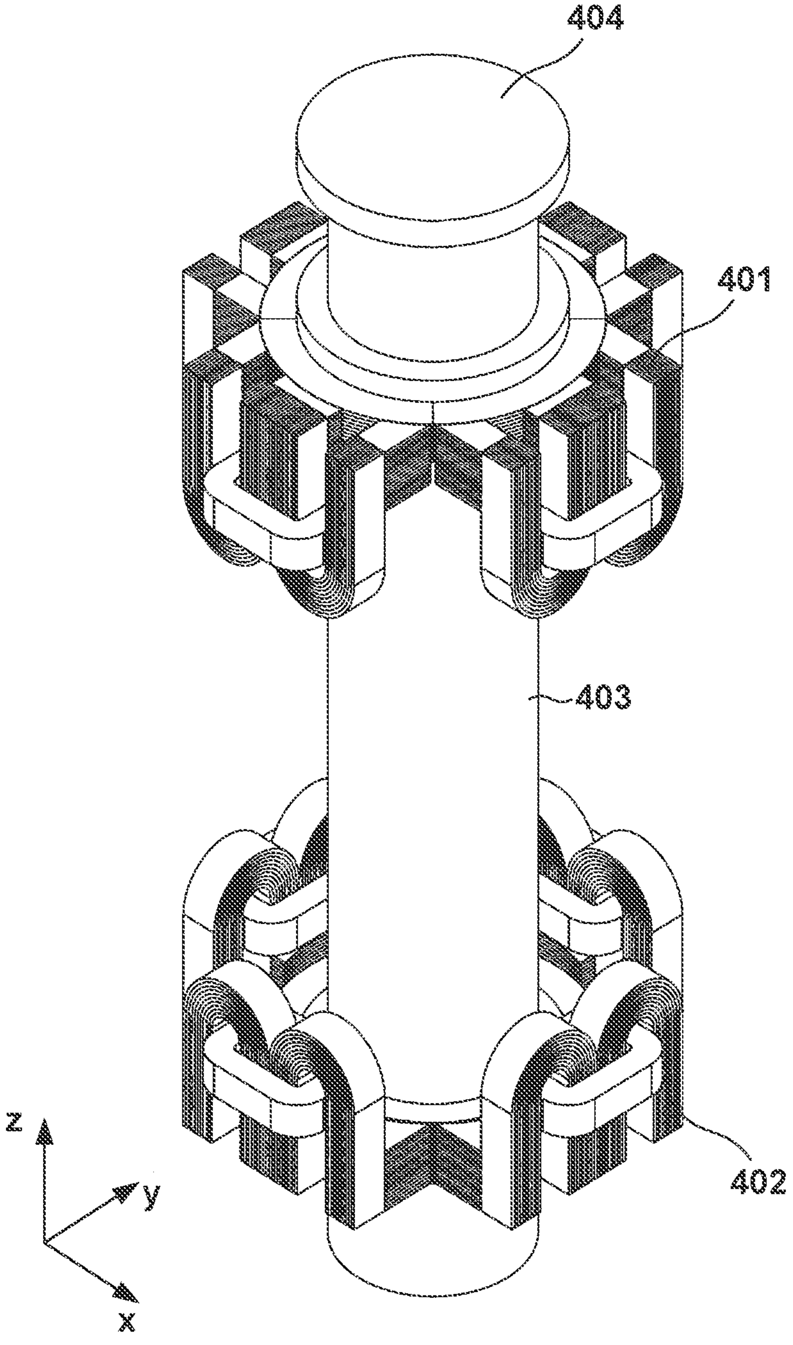
FIG. 25 is a view exemplarily showing the arrangement of a fine motion electromagnet according to the fourth embodiment.

An electromagnetic device according to the fourth embodiment will be described below. Matters which are not referred to as the fourth embodiment can comply with those described in the first to third embodiments unless any contradiction occurs. The fourth embodiment provides an example of applying the electromagnetic device according to the present invention to a magnetic bearing. FIG. 25 exemplarily shows the arrangement of an electromagnetic bearing according to the fourth embodiment.

An electromagnetic bearing 401 can be placed to support a rotating shaft 403. In the case shown in FIG. 25, the fine motion electromagnet having an arrangement similar to that of the fine motion electromagnet 101-3 in FIG. 14 is used. However, another type of fine motion electromagnet 101-3 may be used. A support member **301*a*-31 can be fixed to the rotating shaft 403 and placed on a fixed iron core SC such that a first end faces E1 faces a second end face E2 of a movable iron core MC. The fixed iron core SC can be fixed to a housing (not shown). An acting part 404 can be provided on an end portion of the rotating shaft 403, and a drive target (for example, the rotating blade of a pump such as a turbo-molecular pump) can be attached to the acting part 404**.

The position of the rotating shaft 403 in the XY directions is detected by a sensor (not shown), and the current to be supplied to the coil wound around each fixed iron core can be controlled based on the detection result. The position of the rotating shaft 403 in the XY directions can be controlled by using a sensor and an actuator (neither of which is shown).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075367, filed Apr. 28, 2022, which is hereby incorporated by reference herein in its entirety.

What is claimed is:

1. An electromagnetic device comprising:

a first member having a first end face, a second member having a second end face facing the first end face through an air gap; and a third member, wherein a coil is wound around any of the first member, the second member, and the third member, wherein each of first member and the second member is formed from a laminated body of a plurality of steel plates, wherein a lamination direction of the plurality of steel plates of a first portion of the first member and a lamination direction of the plurality of steel plates of a second portion of the second member are orthogonal to each other, and the first portion and the second portion face each other through the air gap, and wherein the third member is formed from a laminated body of a plurality of steel plates and a lamination direction of the plurality of steel plates of a third portion of the first member and a lamination direction of the plurality of steel plates of a fourth portion of the third member are orthogonal to each other, and the third portion and the fourth portion contact with each other.

2. The device according to claim 1, wherein at least one of the first member and the second member includes a part at which the lamination direction of the laminated body changes at a right angle.

3. The device according to claim 1, wherein the second end face of the second member faces the first end face of the first member through the air gap so that the first member and the second member can move relative to each other.

4. The device according to claim 1, wherein each of the first member and the second member is formed from at least one stacked iron core.

5. The device according to claim 1, wherein at least one of the first member and the second member is formed from a plurality of stacked iron cores.

6. The device according to claim 5, wherein the plurality of stacked iron cores are placed near each other and fixed with a fixing member.

7. The device according to claim 1, wherein the second member includes a portion at which the lamination direction of the plurality of steel plates of the second member gradually changes from a first direction to a second direction orthogonal to the first direction.

8. The device according to claim 1, wherein the device is formed as an electromagnetic actuator.

9. The device according to claim 1, wherein the device is formed as a magnetic bearing.

10. An electromagnetic device comprising:

a first member having a first end face, a second member having a second end face facing the first end face through an air gap, a third member, and a coil wound around third member, wherein each of first member, the second member, and the third member is formed from a laminated body of a plurality of steel plates, and wherein a lamination direction of the plurality of steel plates of a first portion of the first member and a lamination direction of the plurality of steel plates of a second portion of the third member are orthogonal to each other, and the first portion and the second portion face each other through a solid member.

11. An electromagnetic device comprising:

a first member having a first end face, a second member having a second end face facing the first end face through an air gap, and a coil wound around one of the first member and the second member, wherein each of first member and the second member is formed from a laminated body of a plurality of steel plates, and wherein the first member includes a portion at which the lamination direction of the plurality of steel plates of the first member gradually changes from a first direction to a second direction orthogonal to the first direction.

12. An electromagnetic device comprising:

a first member having a first end face, a second member having a second end face facing the first end face through an air gap, and a coil wound around one of the first member and the second member, wherein each of first member and the second member is formed from a laminated body of a plurality of steel plate, wherein one of the first member and the second member includes at least one stacked iron core, the other of the first member and the second member includes a wound iron core including a portion at which a lamination direction of the laminated body of the other of the first member and the second member changes.

13. An electromagnetic device comprising:

a first member having a first end face, a second member having a second end face facing the first end face through an air gap, and a coil wound around one of the first member and the second member, wherein each of first member and the second member is formed from a laminated body of a plurality of steel plate, wherein each of the first member and the second member is formed from a wound iron core, wherein an axial direction of the wound iron core constituting the first member is orthogonal to an axial direction of the wound iron core constituting the second member, wherein the wound iron core of the first member includes a portion at which a lamination direction of the laminated body of the first member changes, and wherein the wound iron core of the second member includes a portion at which a lamination direction of the laminated body of the second member changes.

14. An alignment apparatus that relatively aligns a first object and a second object, the apparatus comprising:

a first positioning mechanism configured to position the first object; and a second positioning mechanism configured to position the second object, wherein at least one of the first positioning mechanism and the second positioning mechanism includes an electromagnetic device, wherein electromagnetic device comprises a first member having a first end face, a second member having a second end face facing the first end face through an air gap, and a coil wound around one of the first member and the second member, wherein each of first member and the second member is formed from a laminated body of a plurality of steel plates, and wherein a lamination direction of the plurality of steel plates of a first portion of the first member and a lamination direction of the plurality of steel plates of a second portion of the second member are orthogonal to each other, and the first portion and the second portion face each other through the air gap.

15. The apparatus according to claim 14, wherein the apparatus is formed as a transfer apparatus configured to transfer a pattern of an original onto a substrate.

16. An article manufacturing method comprising:
- transferring a pattern of an original onto a substrate by using an alignment apparatus defined in claim 15; and
- obtaining an article from the substrate having undergone the transferring.

* * * * *